US012686637B2

(12) United States Patent
Cui et al.

(10) Patent No.: US 12,686,637 B2
(45) Date of Patent: Jul. 21, 2026

(54) HEAT AND FIRE RESISTANT GEOPOLYMER MATERIALS

(71) Applicants: Jessica Cui, Charlotte, NC (US);
Futong Cui, Charlotte, NC (US);
Zhimin Yu, Charlotte, NC (US)

(72) Inventors: Jessica Cui, Charlotte, NC (US);
Futong Cui, Charlotte, NC (US);
Zhimin Yu, Charlotte, NC (US)

( * ) Notice: Subject to any disclaimer, the term of this patent is extended or adjusted under 35 U.S.C. 154(b) by 641 days.

(21) Appl. No.: 17/909,372

(22) PCT Filed: Mar. 4, 2021

(86) PCT No.: PCT/US2021/020882
§ 371 (c)(1),
(2) Date: Sep. 3, 2022

(87) PCT Pub. No.: WO2021/178672
PCT Pub. Date: Sep. 10, 2021

(65) Prior Publication Data
US 2023/0090940 A1 Mar. 23, 2023

Related U.S. Application Data

(60) Provisional application No. 62/985,134, filed on Mar. 4, 2020.

(51) Int. Cl.
| | |
|---|---|
| C04B 28/00 | (2006.01) |
| C04B 14/04 | (2006.01) |
| C04B 14/10 | (2006.01) |
| C04B 14/20 | (2006.01) |
| C04B 14/46 | (2006.01) |
| C04B 18/02 | (2006.01) |
| C04B 18/08 | (2006.01) |
| C04B 20/10 | (2006.01) |
| C04B 111/27 | (2006.01) |
| C04B 111/28 | (2006.01) |
| C04B 111/40 | (2006.01) |

(52) U.S. Cl.
CPC .......... C04B 28/006 (2013.01); C04B 14/043 (2013.01); C04B 14/10 (2013.01); C04B 14/202 (2013.01); C04B 14/465 (2013.01); C04B 18/027 (2013.01); C04B 18/08 (2013.01); C04B 20/1077 (2013.01); C04B 2111/27 (2013.01); C04B 2111/28 (2013.01); C04B 2111/40 (2013.01); C04B 2201/50 (2013.01)

(58) Field of Classification Search
CPC ..... C04B 28/006; C04B 14/043; C04B 14/10; C04B 14/202; C04B 14/465; C04B 18/027; C04B 18/08; C04B 20/1077; C04B 2111/27; C04B 2111/28; C04B 2111/40; C04B 2201/50; Y02P 40/10; Y02W 30/91
See application file for complete search history.

(56) References Cited

U.S. PATENT DOCUMENTS 10,392,308 B2 8/2019 Cui

FOREIGN PATENT DOCUMENTS

| WO | WO-2018026714 A1 * | 2/2018 | ............. | C04B 14/04 |
|---|---|---|---|---|
| WO | WO-2018039750 A1 * | 3/2018 | ............. | C04B 20/12 |

* cited by examiner

*Primary Examiner* — Anthony J Green
(74) *Attorney, Agent, or Firm* — Christopher G. Hayden

(57) ABSTRACT

A light weight geopolymer concrete, having a specific gravity less than 2.0, more typically between 1 and 1.3, is provided that has compressive strength comparable to or greater than ordinary Portland concrete. The light weight geopolymer concrete has low shrinkage, expansion, and cracking, and substantially no loss of compressive strength when exposed to high temperatures of 800° C. or greater, as would occur in a fire. To be useful as a load bearing member for general applications, such as residential housing, the compressive strength of the light-weight geopolymer concrete should be at least 10 MPa, preferably greater than 12 MPa, for example greater than 15 MPa. For more demanding uses, the compressive strength should be near or at the compressive strength of concrete, that is, greater than 20 MPa, preferably greater than 30 MPa, and optimally greater than 35 MPa. To be useful during and after a fire, the strength must not be reduced by more than 20%, preferably not less than 10%, optimally not reduced at all when exposed to heat up to 800° C. Embodiments of the invention include low-density high-temperature-resistant geopolymer concrete which increases load bearing strength when exposed to temperatures above 400° C., preferably at 800° C. Key constituents for forming most embodiments include a geopolymer source such as fly ash, a cement-coated expanded vermiculite, a fiber such as wollastonite, and soluble silicates such as alkali silicates.

17 Claims, 3 Drawing Sheets

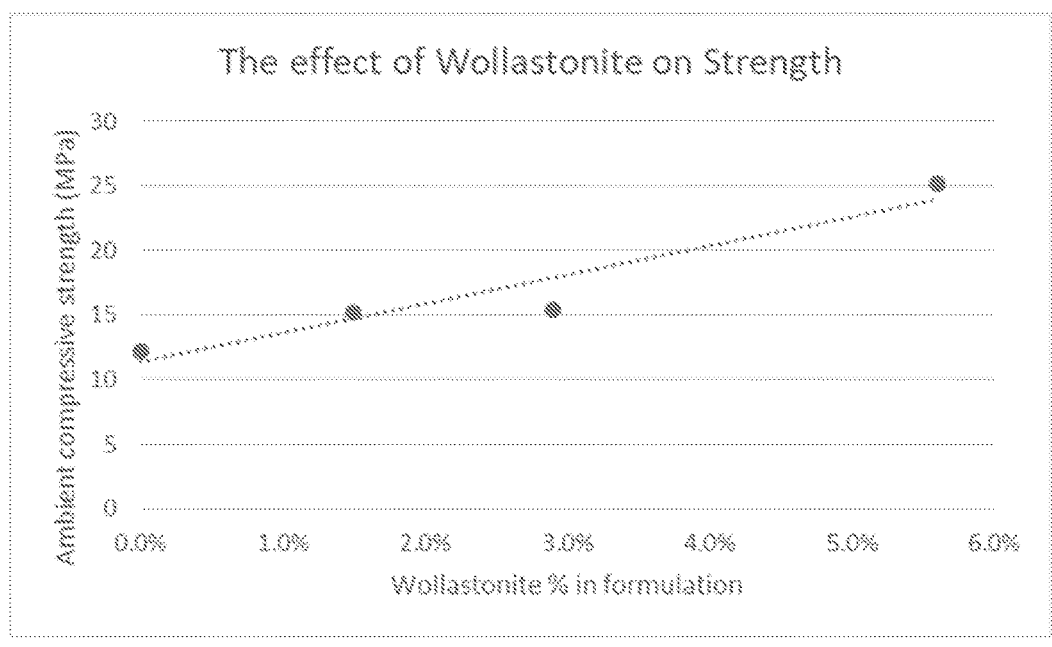
Figure 1, Ambient compressive strength of samples versus Wollastonite content.
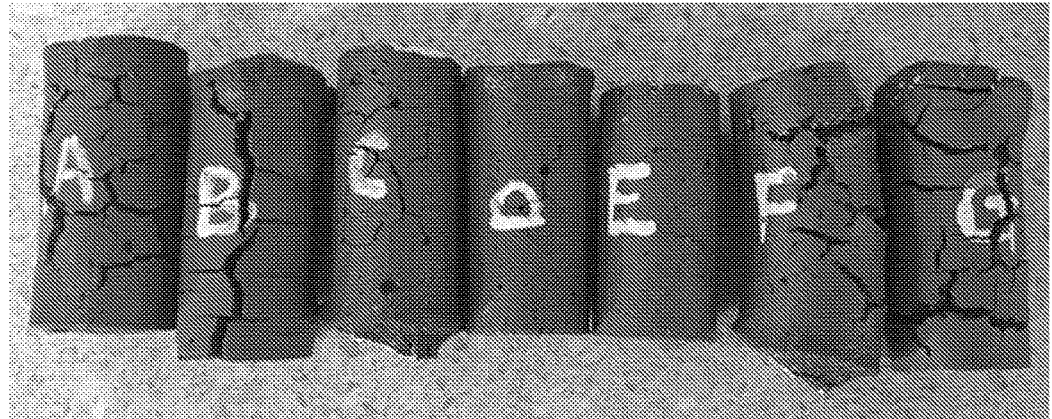
Figure 2.  Appearance of samples after heating to 1000 °C.  From left to right in the photograph is 0807A to 0807G.

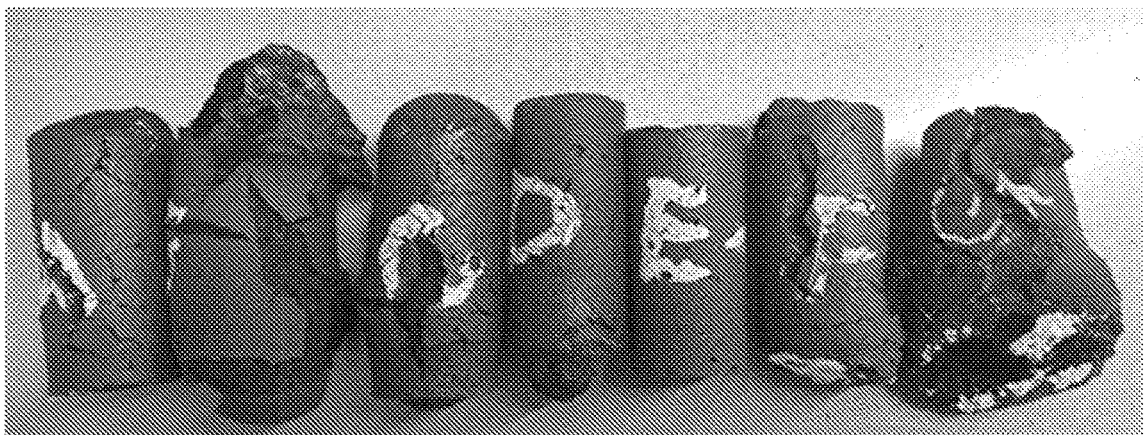
Figure 3. Appearance of comparative samples and Examples after heating to 1000 °C and holding temperature for 30 minutes. From left to right in the photograph is samples 0807A to 0807G.
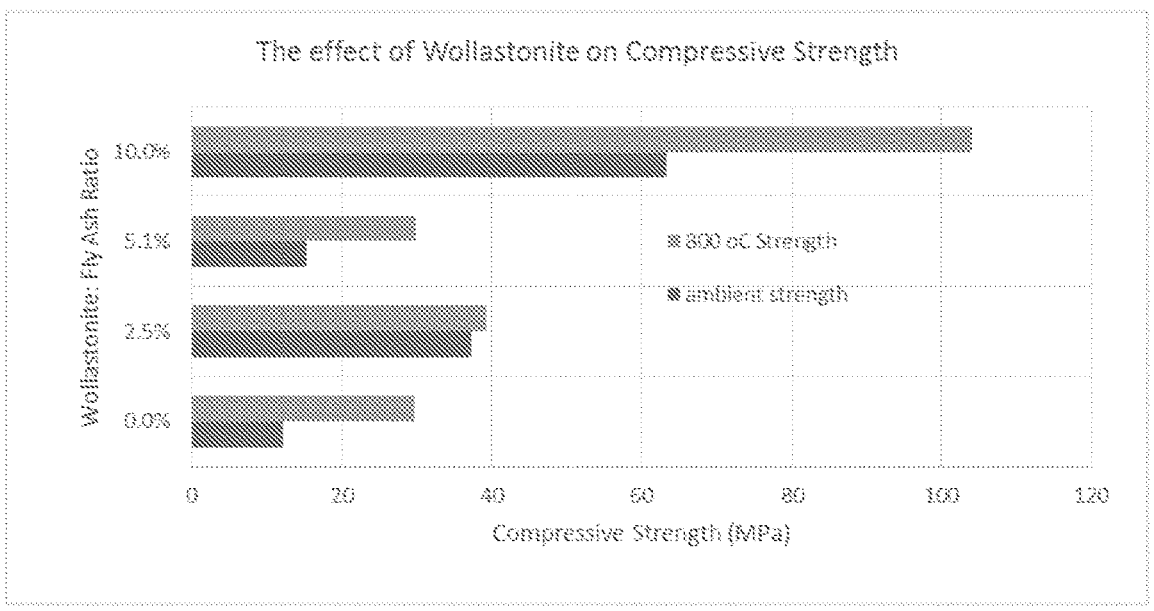
Figure 4. The effect of wollastonite on geopolymer compressive strength measured at ambient temperature and at 800 °C.

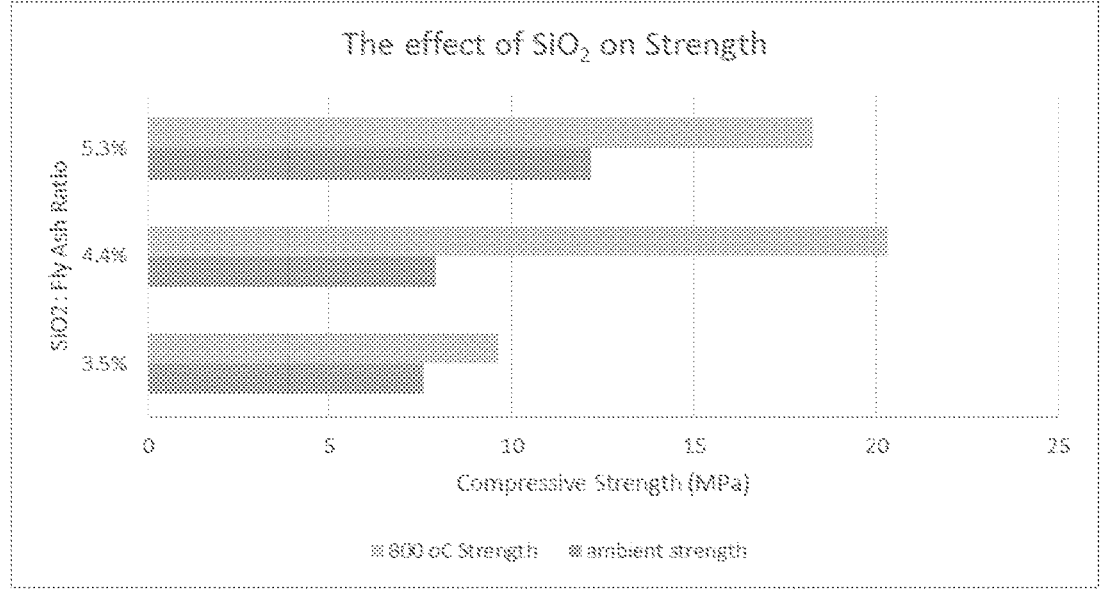
Figure 5. The effect of the soluble silica to ash ratio (by weight) on geopolymer compressive strength measured at ambient temperature and at 800 °C.

HEAT AND FIRE RESISTANT GEOPOLYMER MATERIALS

CROSS-REFERENCE TO RELATED APPLICATIONS

This application claims priority to U.S. Provisional Application No. 62985134 filed on Mar. 4, 2020, the contents of which are incorporated herein by reference thereto for all legal purposes.

TECHNICAL FIELD

The present disclosure also generally relates to geopolymer compositions useful in the preparation of geopolymer cement, the geopolymer solution containing fly ash and further containing soluble $SiO_2$ in an amount up to about 8% by weight, more particularly between about 3 and 6%, for example between 4.4 to about 5.3%, particularly between 4 and 5% by weight, based on the weight of fly ash.

The present disclosure also generally relates to geopolymer compositions useful in the preparation of geopolymer cement, the geopolymer composition containing fly ash and further containing soluble SiO2 in an amount up to about 8% by weight, more particularly between about 3 and 6%, for example between 4.4 to about 5.3%, particularly between 4 and 5% by weight wollastonite, based on the weight of fly ash. The present disclosure also generally relates to geopolymer compositions useful in the preparation of geopolymer cement, the geopolymer solution containing fly ash and further containing alpha alumina in an amount up to about 8% by weight, more particularly between about 3 and 6%, for example between 4.4 to about 5.3%, particularly between 4 and 5% by weight alpha alumina, based on the weight of fly ash. The present disclosure also generally relates to pre-treated, coated, light weight aggregate useful in the preparation of light weight concrete. More particularly, the invention relates to light-weight temperature-resistant geopolymer concretes containing cement-encased expanded vermiculite aggregate, cement-encased expanded perlite, or both, and a method of forming light-weight temperature-resistant geopolymer concretes. The cement used in preferred embodiments further includes soluble silica (alkali silicate) preferably in amounts described above, wollastonite preferably in amounts described above, or both. The concrete is useful for all materials concrete is used for all purposes including but not limited to construction, foundations, flooring, modular pieces, and the like.

BACKGROUND

Fires in buildings and the forest cause tremendous damage each year. Despite of the breakthroughs in material science in the last few decades, there have been little progress in the area of fire protection materials and technology. Halogenated fire retardants, most of which are carcinogens, are still considered some of the most effective fire retardants for textiles. Phosphate-based fire retardants, first discovered in the 1800's, are still being used today for fire protection of wood, plastics, and fibers. One of the most common fire-resistant building materials in use today is the gypsum board.

For load bearing construction, Portland cement is typically used. Ordinary Portland Cement (OPC) has a typical specific gravity of 2.3-2.4 and a minimum compressive strength requirement for construction of 31 MPa (4500 PSI). Conventional concrete is a composite that containing ordinary Portland cement (OPC), aggregate, and water at proportions of approximately 12%, 80%, and 8%, by weight, respectively. Concrete compressive strength can vary from 2500 psi (17 MPa) for residential concrete to 4000 psi (28 MPa) and higher in commercial structures. Some applications use higher strengths, greater than 10,000 psi (70 MPa). Portland cement is incombustible but strictly speaking not a fire-resistant material. Heat from fires causes the cement to de-hydrate and loose strength. Unless special fibers or other additives/techniques are used, Portland cement can also explode (known as spalling) due to the water vapor pressure build up when exposed to fire or other extreme heat sources.

In OPC, as the cement cures and dries, shrinkage is unavoidable. A very effective method to control shrinkage is by adding about 5% of magnesium oxide. Magnesium oxide hydrolyzes very slowly to magnesium hydroxide. Since magnesium hydroxide occupies a much larger volume than the starting magnesium oxide material, the reaction is an expansive process. By coincident, the hydrolysis of magnesium oxide in OPC happens at about the same time period as the OPC shrinkage. The volume shrinkage in curing OPC is therefore compensated (negated) by the simultaneous expansion due to the hydrolysis of magnesium oxide. Magnesium oxide is widely used for the construction of bridges and dams where shrinkage can cause cracks and catastrophe. A family of magnesium oxide-based cement, also known as Sorel cement, have excellent fire resistance among other desirable properties; however, the magnesium oxide-based cements are decomposed by high temperatures and completely loose strength after extended fire exposure.

Lightweight concrete is a conglomerate of cement and lightweight aggregates. It generally has a bulk density ranging between 300 and 2000 kg per cubic meter, compared to a value of 2200 to 2600 kg per cubic meter for normal weight concrete. Some of the advantages of using lightweight concrete include, i) reduction in the dead load, ii) lighter and smaller elements, and iii) high thermal insulation. Structural lightweight concrete (SLWC) is a concrete that is prepared with lightweight aggregates and whose average unit weight ranges from 1000 to 2000 kg per cubic meter, for example between 1400 to 1900 kg per cubic meter, and demonstrates a compressive strength greater than 17.0 MPa. Structural lightweight concrete provides technical, environmental, and economical advantages and has quickly become a material of the future as the world grows more conscious of energy conservation. In certain industries, light-weight concretes are often defined as concretes with a density lower than 1,800 $kg/m^3$, whereas normal-weight (i.e., regular, ordinary, heavy) concretes are defined as concretes with a density higher than 1,800 kg/m3. Light-weight concretes may be subdivided according to their structure to (i) monolithic concretes, which are light-weight concretes having a monolithic structure; (ii) cellular concretes, which are light-weight concretes including large air-voids; and (iii) aggregate concretes, which are light-weight concretes including aggregates. This application concerns aggregate concrete.

To make light weight concretes, low density aggregate is added. Low density concrete made from Portland cement is generally not used for load bearing structures.

Vermiculite is a hydrous phyllosilicate mineral that occurs widely in nature. When exposed to heat quickly, the platelets of the vermiculite are pushed apart by the high-pressure steam. Expanded vermiculite is a low-density material that has an accordion-like structure. Vermiculite is reported to have a service temperature of >1100° C. and a melting point of 1350° C. One significant drawback of expanded vermiculite is its high water absorption, which can be as high as 500%. To achieve low density, large amount of vermiculite aggregate has to be used. To maintain workability in the presence of high levels of vermiculite, more water is needed, which negatively impacts the strength and shrinkage properties of the resultant concrete. A second drawback of expanded vermiculite is its low physical strength. During mixing of cement components, large particles can be broken down, decreasing its effectiveness as a low-density filler.

Vermiculite concrete is a low-density non-structural construction product. It is insulating (both thermally and acoustically) and intrinsically fire resistant. It is normally made simply by mixing exfoliated vermiculite as the aggregate, with cement and water, plus additives such as plasticizers if required. Typical volume ratios of vermiculite to OPC can be from 1:5 to 5:1.

Calcium sulfoaluminate cement is known. It is a rapid setting cement. Calcium ions, for example calcium sulfate, is added to increase setting rates because its presence speeds up the hydration process of CSA cement, but raising the content of calcium sulfate results in a lower strength of the concrete. It is expected to attain higher strength at early ages by the addition of calcium sulfate to the CSA cement. However, it should be noted that the addition of more than 25% calcium sulfate can cause reduced strength due to cracking of the cement matrix.

Inorganic alumino-silicate polymers, commonly known as geopolymers, belong to a family of alumno-silicate inorganic materials. Geopolymers belong to a class of materials made from a source of reactive alumina-silica, and an activator solution such as alkali hydroxide or a mixture of alkali hydroxide and alkali silicate. In agreement with traditions in the field, soluble silica refers to alkali silicate or mixtures of alkali hydroxide and alkali silicate. The amount of the silicate portion of soluble alkali silicate is express as $SiO_2$, while the amount of alkali from alkali silicate and alkali hydroxide sources is express as $Na_2O$ and/or $K_2O$. Geopolymers can be made from inexpensive materials such as calcined clay, blast furnace slags, or fly ash from coal-fired power plants. When properly formulated and processed, the geopolymer material has high strength and excellent heat and fire resistance. Several problems, such as high density, high temperature shrinkage, the requirement of optimum alumina to silica ratio, and the negative impact of high iron contents in the alumina-silica material restricts the wide-spread use of this excellent material.

Typical geopolymer mortar has a typical specific gravity (density) in the range between 2.0 g/cm$^3$ to 2.23 g/cm$^3$, which is at best only slightly lower than the density of Portland cement.

Geopolymer types of concrete include for example "alkali-activated fly ash geopolymer" and "slag-based geopolymer" cement. See, for example, U.S. Pat. No. 5,342,595 titled Process for obtaining a geopolymeric alumino-silicate and products thus obtained, the disclosure of which is included herein for all legal purposes. The geopolymeric alumino-silicates can be grouped by the atomic ratio of silicon to aluminum, which may be 1, 2 or 3, or fractions therebetween for mixed types. With the most commonly used simplified notation, a distinction is made between poly Mn- (Si—O—Al—O) n- or (M)-PS, (sialate)poly Mn- (Si—O—Al—O—Si—O) n- or (M)-PSS,(sialate-siloxo)poly Mn-(Si—O—Al—O—Si—O—Si—O) n- or(sialate- (M)-PSDSdisiloxo). An exemplary process for obtaining a geopolymer of the alkaline poly(sialate-disiloxo) family (M)-PSDS with the ratio Si/Al=3 involves producing geopolymeric material obtained from a reactional mixture containing: a) an aqueous solution of alkaline silicate with a molar ratio $SiO_2$:$M_2O$ comprised between or equal to $SiO_2$:$M_2O$ 1.0:1 and 6.6:1 the concentration of which is over 60% wt and where the initial viscosity at 20° C. is 200 centipoises, then increases but does not exceed 500 centipoises before 5 hours at 20° C.; b) an alumino-silicate oxide ($SiO_2$, $Al_2O_3$) in which the Al cation is in coordination (IV-V), as determined by the MAS-NMR spectrum for $^{27}$Al, the said oxide being in such a quantity that the molar ratio $Al_2O_3$:$SiO_2$ is comprised between or equal to $Al_2O_3$:$SiO_2$ 1:1 and 1:6.5, and then allowing the geopolymeric material to cure. The above description is exemplary and not restrictive.

Geopolymer cement is a binding system that hardens at near or at ambient "room" temperature. Geopolymer cement is a more environmentally friendly alternative to conventional Portland cement. Geopolymer cement is formed by providing aluminosilicates, such as calcined clays, kaolinitic clays, lateritic clays, volcanic rocks or ash, coal fly ash, slag, and the like, with alkaline reagents such as soluble sodium, potassium, (or both) silicates, and water. Production of geopolymer cement requires an aluminosilicate precursor material such as metakaolin or fly ash, an alkaline reagent, for example, sodium/potassium soluble silicates with a molar ratio of $SiO_2$ to (K, Na)$_2$O≥1, preferably greater than 1.65, and water. Room temperature hardening is readily achieved with the addition of a source of calcium cations, often blast furnace slag, as an accelerator.

Hardening (setting) of geopolymer cement occurs via poly-condensation, for example by poly-condensation of potassium oligo-(sialate-siloxo) into potassium poly(sialate-siloxo) cross linked network. A simple form of the geopolymer matrix is repeating units of [($Al_2O_3$-) ($SiO_2$-)$_2$]. In contrast, hardening of Portland cement occurs via hydration of calcium silicate into calcium silicate hydrate (C—S—H) and portlandite, Ca(OH)$_2$. Geopolymer cements can be formulated to cure more rapidly than Portland-based cements; some mixes gain most of their ultimate strength within 24 hours. However, they must also set slowly enough that they can be mixed at a batch plant, either for pre-casting or delivery in a concrete mixer. Geopolymer cement also has the ability to form a strong chemical bond with silicate rock-based aggregates.

Geopolymers are an environmentally friendly substitute for concrete.

Geopolymers are theoretically naturally fire resistant since they are inorganic polymers having a silicate-aluminate backbone. The continuous micro and nano-pores in the structure help to dissipate the vapor pressure therefore eliminate the spalling problem. U.S. Pat. No. 8,864,901 teaches inorganic polymer compositions and methods for their preparation are described herein. The materials are useful as for fire protection and can be spray applied or used as sheets of fire resistant material. The compositions of U.S. Pat. No. 8,864,901 include the reaction product of a reactive powder, an activator, and optionally a retardant. The reactive powder includes fly ash, calcium sulfoaluminate cement, and less than 10% by weight portland cement. Fly ash is the principal component of the reactive powder. In some examples, the fly ash is present in an amount of greater than 85% by weight of the reactive powder, greater than 90% by weight of the reactive powder, or greater than 95% by weight of the reactive powder. The inorganic polymer compositions further include calcium sulfoaluminate cement. Calcium sulfoaluminate cement includes cements containing a mixture of components, including, for example, anhydrous calcium sulfoaluminate, dicalcium silicate, and/or gypsum. Calcium sulfoaluminate cement reacts with water to form ettringite and thus contributes to the high early compressive strength of the inorganic polymers. In some examples, the calcium sulfoaluminate cement is present in an amount of from 0.1% to 10% based on the weight of the reactive powder. For example, the calcium sulfoaluminate cement can be present in an amount of from 0.5% to 8% by weight or from 1% to 5% by weight of the reactive powder. Examples of suitable lightweight aggregate includes bottom ash, expanded clay, expanded shale, expanded perlite, vermiculite, volcanic tuff, pumice, hollow ceramic spheres, hollow plastic spheres, expanded plastic beads (e.g., polystyrene beads), ground tire rubber, and mixtures of these. Further examples of suitable aggregates and fillers include other types of ash such as those produced by firing fuels including industrial gases, petroleum coke, petroleum products, municipal solid waste, paper sludge, wood, sawdust, refuse derived fuels, switchgrass, or other biomass material; ground/recycled glass (e.g., window or bottle glass); milled glass; glass spheres; glass flakes; activated carbon; calcium carbonate; aluminum trihydrate (ATH); silica; sand; alluvial sand; natural river sand; ground sand; crushed granite; crushed limestone; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; soy meal; pulverized foam; and mixtures thereof. While useful as temperature resistant coatings, said material is not ideal for load bearing construction. Compositions in U.S. Pat. No. 8,864,901 are considered as Alkali Activated Cement (AAC). The CSA and OPC in the compositions are insufficient to form truly three-dimensional networks as in geopolymers.

U.S. Pat. No. 8,519,016 discloses a lightweight cementitious binder composition containing fly ash, alkali metal salt of citric acid, alkali metal silicate, foaming agent for entraining air, and water (Column 3, Lines 46-62; Column 4, Lines 20-25; Column 4, Lines 60-67; Column 8, Lines 1-5). The invention is directed toward a method of making a lightweight cementitious binder composition with improved compressive strength for products such as cementitious panels. The method mixes fly ash, alkali metal salt of citric acid, alkali metal silicate, foaming agent for entraining air, water and in the preferred embodiment a foam stabilizing agent. Compositions which include fly ash selected from the group consisting of class C fly ash, class F fly ash and mixtures thereof, alkali metal salts of citric acid, alkali metal silicates, foaming agents, and preferably a foam stabilizer, such as polyvinyl alcohol, and do not require use of set retarders. Compositions containing class F fly ash can optionally contain Type III Portland cement.

U.S. Pat. No. 8,167,998 discloses a lightweight ready-mix concrete composition containing coarse aggregate combination such as ground granulated blast furnace slag, fly ash, glass, silica, expanded shale, perlite, and/or vermiculite, as well as set retarders such as borates. In its broadest context, the patent discloses a lightweight ready-mix concrete composition that contains 8-20 volume percent cement, 11-50 volume percent sand, 10-31 volume percent expanded particles, 9-40 volume percent coarse aggregate, and 10-22 volume percent water, where the sum of components used does not exceed 100 volume percent. The expanded particles have an average particle diameter of from 0.2 mm to 8 mm, a bulk density of from 0.02 g/cc to 0.64 g/cc, an aspect ratio of from 1 to 3. The slump value of the composition measured according to ASTM C 143 is from 2 to 8 inches. After the lightweight ready-mix concrete composition is set for 28 days, it has a compressive strength of at least 1400 psi as tested according to ASTM C39.

WO 2016/016385A1 discloses a geopolymer used as a binder for fire resistant insulating material (Page 1, Lines 3-7; Page 6, Lines 2-9; Page 7, Lines 30-33; Page 8, Lines 5-15). The reference illustrates use of a geopolymer in a coating composition for a building construction component, a coated component for use in building construction wherein the coating comprises a geopolymer, a method of coating a component comprising applying a curable geopolymer mixture to a surface of the component and curing the mixture to form a cured geopolymer coating, and the use of a geopolymer as a mortar.

U.S. Patent Publication No. 2014/0047999 discloses an acid and high temperature resistant cement composite containing fly ash and ground slag. The patent is largely directed toward a process for the production of acid and high temperature resistant cement composites, where the matrix is alkali activated F fly ash alone, F Fly ash combined with ground slag or ground slag alone. F-fly ash produces lower quality alkali activated cement systems. On the other hand, the lack of calcium oxide results in very high resistance to medium and highly concentrated inorganic or organic acids. The high strength and low permeability of pure F-fly ash cement systems is achieved by using in the composition un-densified silica fume, the amorphous silicon dioxide obtained as by products in production of ferro-silicones. Precipitated nano-particle silica made from soluble silicates and nano-particle silica fume produced by burning silicon tetra chloride in the hydrogen stream.

U.S. Patent Publication No. 2015/0321954 discloses a geopolymer cement containing fly ash and granulated blast furnace slag. The patent discloses a solid component activator for use in a geopolymer cement containing a silico-aluminate material comprising a mixture of sodium silicate and sodium carbonate for activating the geopolymer cement by increasing reactivity of the silico-aluminate material in the geopolymer cement when forming geopolymer concrete.

Geopolymers suffer from shrinkage when heated. At temperatures of 300° C. or lower, the evaporation of free water from the capillaries causes significant shrinkage. In the temperature range of 250-600° C., geopolymers show a small shrinkage due to de-hydroxylation, i.e. condensation between Si—OH and Si—OH, or between Si—OH and Al—OH. Shrinkage in this temperature range can only be minimized by controlling the amount of water in the mix or by having a strong geopolymer matrix. Therefore, it is critical to have low water content in the formulation.

In the temperature range of 550 to 900° C., geopolymers show another significant shrinkage due to densification by vitreous flow. It was reported that the residual water content, the Si:Al ratio, and other factors affect the softening temperature of the material. Unreacted or excess alkaline metal oxides, silicates are expected to decrease the softening temperature, leading to early shrinkage and more extensive shrinkage.

Finally, at temperatures encountered in severe fires, such as over 800° C. to 1200° C., geopolymer cements and concretes experience further expansion, cracking, and loss of strength. Prior art geopolymer concretes are not particularly useful for load bearing structures which may encounter fire, and geopolymers that have such expansion, cracking, and loss of strength at high temperatures that the material has limited use in construction, and is not useful for load-bearing members. Zulkifly etc (2017) reviewed the behavior of geopolymers at high temperatures. Iron oxide, a common material in fly ash, was reported to be responsible for cracking of geopolymer at high temperatures (Richard etc, 2015). The strength of certain geopolymers decreased from 100 MPa to 2 MPa after being heated to 600° C. Research also showed that a high silica to alumina ratio in the geopolymer raw material is undesirable for strength retention after high temperature exposures (Vickers etc 2014).

The problems of structural concrete failure under load are exacerbated when forming low density concretes which requires the use of low-density fillers or aggregate. Materials based on the magnesium oxide cement (Sorel cement) typically has a specific gravity of 0.8-1.1. Gypsum boards (drywall) for construction has a specific gravity of <1.0. It would be useful for the industry to have lightweight geopolymer concretes of specific gravity 0.8 to 2, more particularly from 1 to 1.8, where the material can be used for structural load-bearing components.

Two aggregates common in both conventional lightweight concrete and in geopolymer light-weight concrete are vermiculite and perlite. Density varies with moisture content, size, and other factors. Vermiculite, an Iron-magnesium aluminum silicate material, has an expanded Bulk Density ($kg/m^3$) of about 50-150 for 16 mm diameter particles, 70-150 for 4 mm diameter particles, and 80-250 for <1mm diameter particles. Unexpanded vermiculite has density near 2500 $kg/m^3$. Therefore, expanded vermiculite provides the lower density needed for low density concretes. Expanded vermiculite absorbs water, and can hold for example 200-500% by weight water., Unexpanded perlite has a bulk density around 1100 $kg/m^3$, while typical expanded perlite has a bulk density of about 30-150 $kg/m^3$. Because of perlite's outstanding insulating characteristics and light weight, it is widely used as a loose-fill insulation in masonry construction. In this application, free-flowing perlite loose-fill masonry insulation is poured into the cavities of concrete block where it completely fills all cores, crevices, mortar areas and ear holes. Perlite absorbs 40% to 70% by weight water. Adding low density fillers, such as expanded perlite or hollow glass spheres, is a typical practice to decrease the density of materials including concrete. Since glass has a relatively low melting point and high price, their use for construction materials will be limited.

There are clear advantages of structural lightweight concrete over normal weight concrete. For example, structural lightweight concrete has a greater strength/weight ratio, lower thermal conductivity, superior fire resistance, and enhanced durability properties. In addition, the use of structural lightweight concrete decreases the dead load, which leads to a reduction in the size of columns, beams, walls and foundations that reduces resulting seismic loads and earthquake damage, which are proportional to the weight of the structure. However, the most significant potential advantage to the use of structural lightweight concrete is environmental protection. If the raw materials needed for the production of structural lightweight concrete can be derived from natural sources and industrial waste products, the environment and economy stand to benefit. In addition, the use of structural lightweight concrete can result in a significant reduction in greenhouse gas emissions by reducing the need for larger quantities of cement whose production is a major contributor to $CO_2$ emissions.

The market needs a low-cost and durable fire-resistant light-weight geopolymer cement and concrete that maintains dimensional stability and compressive strength after fire exposure. Thus, a need exists in the current state of the art to address these and other deficiencies and inadequacies of the conventional systems and methods, to overcome the previously mentioned shortcomings of the prior art, to improve the conventional materials.

SUMMARY

The invention provides a light weight geopolymer concrete that solves problems related to geopolymer concrete shrinkage and expansion, cracking, and strength loss when exposed to fire or high temperatures. The density of the light-weight concrete can be in the range of less than 2 g/cc, for example less than 1.8 g/cc, more preferably less than 1.6 g/cc, and in preferred embodiments for load bearing structural concrete between 1.1 and 1.4 g/cc. Specific gravity of the geopolymer concrete should be less than 2, e.g., 0.4 to 0.6, 0.6 to 0.8, 0.8 to 1, 1.0 to 1.2, 1.2 to 1.4, 1.4 to 1.6, 1.6 to 1.8, or any ranges combining the lower portion of a first range with the upper portion of a second range. Note "specific gravity" is used throughout interchangeably with density, but specific gravity (measured by example by weight versus volume of displaced water, where the sample has no voids therein) is the correct terminology. To be useful as a load bearing member for general applications, such as residential housing, the compressive strength of the light-weight geopolymer concrete should be at least 10 MPa, preferably greater than 11 MPa, for example greater than 12 MPa. For more demanding uses, the compressive strength should be near or at the compressive strength of concrete, that is, greater than 20 MPa, preferably greater than 30 MPa. Generally, a specific gravity of greater than 1, for example from 1.1 to 1.5, is required for the required compressive strength of structural concrete. To be useful during and after a fire, the strength must not be reduced by more than 20%, preferably no more than 10%, optimally not reduced at all when exposed to heat up to 800° C. or 1000° C.

The invention further relates to a low-density high-temperature-resistant geopolymer concrete which increases load bearing strength (compressive strength) when exposed to temperatures above 400° C., preferably to 800° C.

The present invention relates to aluminosilicate composites which are obtained through a manufacturing process that allows the production of artifacts that can be molded or extruded and, in whose manufacture, certain raw materials may be aggregated and thus obtain, according to each aggregate, products that could replace traditional ceramics, Portland-cement pre-cast products, timber, plastics, agglomerated plates, aluminum and fiber cement.

The lightweight concretes of the present invention include lightweight (or low density or low specific gravity, alternatively) aggregate geopolymer concrete, low-density high-temperature-resistant geopolymer cement, geopolymer-concrete, mixed geopolymer-Portland cement mixtures, and mixed geopolymer-Portland cement mixtures. The materials of this invention can be used as structural load-bearing members, as a spray-applied cementitious fireproofing fire-resistant coating, and as structural members such as floors and roofs.

The invention also relates to a method of manufacture of the low-density high-temperature-resistant geopolymer concrete. The low-density high-temperature-resistant geopolymer concrete can be used in all manners known for geopolymer cement, including soundproofing coatings, extruded objects, preformed objects, and on-site beams, columns, foundations, floors, wall, and the like. The low-density high-temperature-resistant geopolymer concrete so formed is resistant to structural damage caused from internal stresses which occur when the cured material is exposed to extreme heat, such as 800° F. to 1400° F., or from 350° C. to over 800° C., such as occurs when structural members are exposed to fire. The material so formed is therefore particularly useful as structural members, especially when used in structures also comprising normal cement, steel, and other conventional construction materials.

The invention also relates to improved geopolymer cement which can be used in all manners known for geopolymer cement, including soundproofing coatings, extruded objects, preformed objects, and on-site beams, columns, foundations, and the like.

The invention also relates to a treated light weight aggregate material, formed from cement-coated expanded perlite or expanded vermiculite, preferably expanded vermiculite, where the aggregate is coated with a fast drying cement to minimize water absorption by the aggregate. This aggregate can be used to form light weight cements that are resistant to heat and fire.

Specifically disclosed embodiments of the invention include the following.

A lightweight geopolymer concrete, comprising geopolymer and a cured cement-coated light weight aggregate material, said cement having a different composition than the geopolymer, said lightweight geopolymer concrete having a specific gravity less than 2.0 and a compressive strength of at least 10 MPa, wherein said lightweight geopolymer concrete has substantially no loss of compressive strength when exposed to high temperatures of 800° C. Said lightweight geopolymer concrete can be formed from reacting a geopolymer source material, soluble alkaline silicate, a fiber, in the presence of said cement-coated light weight aggregate material, wherein said lightweight geopolymer concrete advantageously has a compressive strength of at least 15 MPa. The lightweight geopolymer concrete can be formed from polymerizing 100 parts of geopolymer source material, between 2 and 10 parts soluble alkali silicate, in the presence of between 2 and 12 parts by weight wollastonite and between 5 and 40 parts cured cement coated vermiculite, wherein advantageously said lightweight geopolymer concrete has a compressive strength of at least 20 MPa. Preferably the lightweight geopolymer concrete has a compressive strength of at least 30 MPa. In preferred embodiments, the lightweight geopolymer concrete contains a cured cement-coated light weight aggregate material comprising expanded vermiculite (or other lightweight aggregate) coated with a cured cement coating prior to curing the geopolymer concrete. The coating on the vermiculite in preferred embodiments comprises calcium sulfoaluminate cement, calcium aluminate cement, or mixtures thereof, in an amount of between 0.2 to 5 parts by weight cement to 1 part by weight of expanded vermiculite. Advantageously the cured cement-coated light weight aggregate material comprises expanded vermiculite and calcium sulfoaluminate cement in an amount between 0.5 parts and 2 parts by weight of cement per part by weight expanded vermiculite. The cement-coated light weight aggregate material may further comprises a water repellant in an amount sufficient to retard or prevent water absorption by the light-weight aggregate. The cement-coated light weight aggregate material may further comprise or alternately comprise between 0.1 to 4 parts by weight fly ash or clay per part cement.

Another embodiment of the invention is a lightweight geopolymer concrete comprising geopolymer, a fiber material, and a cured cement-coated light weight aggregate material, said cement coating on the aggregate comprising calcium and having a different composition than the geopolymer, said lightweight geopolymer formed from a geopolymer source material and about 0.03 to 0.08 parts of soluble alkali silicate per part of geopolymer source material, wherein said lightweight geopolymer concrete has substantially no loss of compressive strength when heated to 800° C. The lightweight geopolymer concrete advantageously has a specific gravity of between about 0.8 to about 1.5 and a compressive strength of at least 30 MPa. Preferably, the compressive strength of the concrete after heating the concrete to a temperature of 800° C. is higher than the compressive strength of the concrete after curing at ambient or slightly elevated temperature, that is, when cured at between about 25° C. to about 70° C.

Also included in the invention is a method of forming the various above-described lightweight geopolymer concrete comprising the steps of a) providing a 100 parts by weight of a source of geopolymer, between 2 and 100 parts by weight of a cement-coated lightweight aggregate, between 2 and 20 parts of a soluble alkali silicate, and b) curing the geopolymer concrete. Advantageously between 0.5 and 20 parts of micro-fibers are additionally added prior to polymerization. Exemplary micro-fibers comprise wollastonite, micro-wools of mineral nature, or mixtures thereof. Advantageously the geopolymer concrete is heated to at least 50° C. during or after curing. Preferred methods include further adding an effective amount of one or more additives including but not limited to cure retarders, cure accelerators, water reducers, and colorants to the geopolymer solution prior to or during polymerization, in amounts disclosed in the application or as generally known in the art. Alternately or additionally, chopped fibers, woven or non-woven fiber mats, or mixtures of the above are added prior to polymerizing.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

FIG. 1 is a graph showing the effect of wollastonite on geopolymer compressive strength, measured under ambient conditions, versus wollastonite content. The graph shows an approximate increase of 2 MPa per percent by weight of wollastonite.

FIG. 2 shows the appearance of samples of comparative examples and of Examples after heating to 1000° C. From left to right in the photograph is samples 0807A to 0807G.

FIG. 3 shows the appearance of comparative samples and Examples after heating to 1000° C. and holding temperature for 30 minutes. From left to right in the photograph is samples 0807A to 0807G.

FIG. 4 is a graph showing the effect of wollastonite on geopolymer compressive strength measured at ambient temperature and after exposure at 800° C.

FIG. 5 is a graph showing the effect of the soluble silica to ash ratio (by weight) on geopolymer compressive strength measured at ambient temperature and after exposure at 800° C.

DETAILED DESCRIPTION

In view of the forgoing, one object of the present disclosure is to provide structural lightweight concrete compositions with high thermal insulation that utilize natural aggregates, polymeric synthetic aggregates and industrial waste byproducts in the disclosed materials, wherein said lightweight concretes, especially geopolymer concretes, maintain more than 50%, preferably more than 70%, most preferably more than 80%, for example more than 90% of their initial compressive strength after exposure to temperatures of 400° C., 600° C., 800° C., or alternatively 1000° C., as may be experienced in a fire. In preferred embodiments, compressive strength of the lightweight geopolymer concrete may increase after exposure to temperatures exceeding 400° C., 600° C., 800° C., or alternatively 1000° C. A further aim of the present disclosure is to provide structural lightweight concrete products comprising said compositions and to provide methods for producing said structural lightweight concrete products.

By lightweight it is meant that the lightweight geopolymer concrete has a specific density of between 0.4 and 2, more particularly between 1 and 1.8, and for structural concrete used in load bearing pillars, columns, walls, and the like, more typically between 1.1 and 1.8, for example between 1.2 and 1.4. The conversion factor between specific gravity to kg/m³ is 1000, so lightweight concretes are generally defined as having a density less than 2000 kg/m³, more typically less than 1800 kg/m³. Occasionally, when the symbol "%" is used, it means parts by weight of component per 100 parts by weight of the dry geopolymer source material, e.g., the fly ash. When vermiculite or perlite is mentioned, it is understood that this refers to expanded vermiculite and expanded perlite, respectively, even if the word "expanded" is not present. When fly ash is mentioned, it should be understood that the invention is expected to work similarly with any other source of geopolymer material. Fly ash is mentioned primarily because it was the source of the geopolymer material, but the invention is not to be limited to geopolymers formed only from this source. Soluble silica refers to the silicate portion of the geopolymer activator composition. Its amount is commonly expressed as $SiO_2$. The alkali portion of the geopolymer activator composition is expressed as $Na_2O$ and/or $K_2O$. The alkali can come from soluble alkali silicate and alkali hydroxide.

The manufacture of geopolymers is well known. An exemplary geopolymer for use in this invention was made by using ordinary waste materials such as coal fly ash. Other raw materials can be used to formulate geopolymers useful for this invention. There are a number of known commercial sources of geopolymer material, including slags, calcined clay, and the like, which are acceptable alternatives to fly ash. The object of this invention was to provide a lightweight geopolymer concrete that has reduced shrinkage and subsequent expansion when exposed to heat ranging from ambient to 1000° C., and that lightweight geopolymer concrete the lightweight geopolymer concrete maintained its compressive strength when exposed to heat ranging from ambient to 1000° C.

Generally, unless otherwise specified, percents as used herein are percent by weight, or, for cement and concrete compositions, % compared to the dry weight of the cement, e.g., the OPC or fly ash or other source of geopolymer cement. The latter is equivalent to parts by weight, based on 100 parts of the dry geopolymer source material. For example, a composition having "10% wollastonite" would contain 100 parts by weight geopolymer source material, e.g., fly ash, and 10 parts by weight wollastonite.

One aspect of the invention is a lightweight geopolymer concrete comprising geopolymer and a cured cement-coated light weight aggregate material, said cement having a different composition than the geopolymer, said lightweight geopolymer concrete having a specific gravity less than 1.6 and a compressive strength of at least 10 MPa, wherein said lightweight geopolymer concrete has substantially no loss of compressive strength when exposed to high temperatures of 800° C. Another aspect of this invention requires said lightweight geopolymer concrete be formed from reacting a geopolymer source material, soluble silica, a fiber, in the presence of said cement-coated light weight aggregate material, wherein said lightweight geopolymer concrete has a compressive strength of at least 15 MPa. Another aspect of this invention requires said lightweight geopolymer concrete be formed from polymerizing 100 parts of geopolymer source material, between 2 and 10 parts soluble silica, in the presence of between 2 and 12 parts by weight wollastonite and between 5 and 40 parts cured cement coated vermiculite, wherein said lightweight geopolymer concrete has a compressive strength of at least 20 MPa. Another aspect of this invention requires said lightweight geopolymer concrete have a compressive strength of at least 30 MPa. Another aspect of this invention requires said cured cement-coated light weight aggregate material comprise, consist essentially of, or consist of expanded vermiculite coated with a cured cement coating, said coating comprising calcium sulfoaluminate cement, calcium aluminate cement, or mixtures thereof, in an amount of between 0.2 to 5 parts by weight cement to 1 part by weight of expanded vermiculite. Another aspect of this invention requires the cured cement-coated light weight aggregate material comprise expanded vermiculite and calcium sulfoaluminate cement in an amount between 0.5 parts and 2 parts by weight of cement per part by weight expanded vermiculite. Another aspect of this invention requires the cement-coated light weight aggregate material further comprises a water repellant. Another aspect of this invention requires the cement-coated light weight aggregate material further comprises between 0.1 to 4 parts by weight clay or fly ash per part cement.

Another aspect of the invention is a lightweight geopolymer concrete comprising geopolymer, a fiber material, and a cured cement-coated light weight aggregate material, said cement coating on the aggregate comprising calcium and having a different composition than the geopolymer, said lightweight geopolymer formed from a geopolymer source material and about 0.03 to 0.08 parts of soluble silica per part of geopolymer source material, wherein said lightweight geopolymer concrete has substantially no loss of compressive strength when heated to 800° C. Another aspect of this invention requires said lightweight geopolymer concrete have a specific gravity of between about 0.8 to about 1.5 and a compressive strength of at least 30 MPa. Another aspect of this invention requires the compressive strength of the concrete after heating the concrete to a temperature of 800° C. be higher than the compressive strength of the concrete after initial curing.

Another aspect of the invention is a method of forming a lightweight geopolymer concrete comprising the steps of a) providing a 100 parts by weight of a source of geopolymer, between 2 and 100 parts by weight of a cement-coated lightweight aggregate, between 2 and 20 parts of a soluble silica, and b) curing the geopolymer concrete. Another aspect of this invention requires between 0.5 and 20 parts of micro-fibers are added prior to polymerization. Another aspect of this invention requires the microfibers comprise wollastonite, micro-wools of mineral nature, or mixtures thereof. Another aspect of this invention further requires optional heating the cured geopolymer concrete to at least 50° C., or alternatively to 200° C. Another aspect of this invention requires adding an effective amount of one or more additives including but not limited to cure retarders, cure accelerators, water reducers, and colorants. Another aspect of this invention requires adding chopped fibers, woven or non-woven fiber mats, or mixtures of the above prior to polymerizing.

It was reported in the literature that geopolymers suffer from shrinkage when heated. At temperatures of 300° C. or lower, the evaporation of free water from the capillaries causes significant shrinkage. Shrinkage in this temperature range can only be minimized by controlling the amount of water in the mix or by having a strong geopolymer matrix. Therefore, it is critical to have low water content in the geopolymer formulation. However, as will be described later, the desire for low density requires the use of low-density fillers. Most of the low-density fillers absorb water. To have a workable mixture, additional water is required to maintain flowability. This contradiction had to be resolved in order to achieve the goals of low density, high strength material.

Vermiculite cement is known. It was discovered that expanded vermiculite can be coated with a rigid coating, preferably a substantially waterproof coating, to increase its strength and decrease its water absorption, and then this material, in loose aggregate form, could be used as a lightweight aggregate in the subsequent manufacture of cement, particularly geopolymer cement. Suitable coatings comprise or consist essentially of OPC, calcium sulfoaluminate (CSA) cement, calcium aluminate cement, or their mixtures. Of these, calcium sulfoaluminate cement is the preferred major component of the coating. The coating can also comprise a geopolymer composition. Optionally, the expanded vermiculite, the coating composition, or both further comprise a water repellent, for example a silicone water resistant liquid. Additionally, the coating composition can comprise fly ash or a fine clay such as kaolin, fire clay, montmorillonite, bentonite, or attapulgite. The cementitious coating can further comprise other fillers, micro-aggregates, and additives known in the art, including strength enhancing additives such as Wollastonite.

Without being bound by theory, we believe the composition and properties of the aggregate compenstate, at least partially, for changes in the geopolymer, thereby reducing stress in the cement matrix. When the aggregate are too big, they would be less effective in absorbing the stress. While aggregate material as large as an inch can in theory be used, much benefit will be lost. Useful particle sizes range from about 0.02 to 15 mm, more typically from 0.05 to 10 mm, for example 0.075-5 mm, or 0.1 mm to 3 mm. Samples used average particle sizes near 0.2 to 5 mm, but best results were obtained with aggregate particle sizes nearer 0.2 mm to 1 mm or 0.3 mm to 0.5 mm range, say about 0.3 mm.

It is recognized that the amount of cement can greatly affect the density of the aggregate, especially with smaller particle sizes. Volume ratio of coated aggregate to fly ash is also a good idea. The aggregate used in examples had a specific gravity near 0.38, so w/w 5-40 parts aggregate per 100 parts geopolymer based on fly ash would be about 13-105 ml of vermiculite per 100 grams of fly ash. 15-20% w/w is equivalent to 39-52 ml of vermiculite per 100 grams of fly ash. Since typical geopolymer specific gravity is between 2 and 2.3, say 2.15, 5 to 40 parts aggregate per 100 parts geopolymer is equivalent to about 20% to about 70% volume/volume of aggregate to concrete. A preferred range is 25% to 50% volume/volume of aggregate to concrete. Similar volume percentages can be used with perlite, or with mixtures thereof. The Sil cell perlite used in examples was Sil Cell 42, has a median particle size of 45 microns, range is 1 to 220 microns. The larger particle size perlite was Permalite Block fill, 95% within 0.3-3.4 mm, maximum particle size 9 mm. Better strength was observed with the smaller particles.

The cement coating must be substantially cured prior to forming the light weight concrete or light weight geopolymer concrete, so the coating remains substantially intact as the cement is mixed, formed, and cured. The material is advantageously in the form of loose aggregate when used to as an additive for geopolymer cement. When the cementitious coating has calcium, and the cement is a geopolymer, the expanded coated vermiculite has the ability of accelerating the cure of geopolymers. This is believed to be the result of calcium catalyzing the polymeric reaction.

It may be possible that a geopolymer can be formed within a solid, highly porous vermiculite cement, though the geopolymer source fluid would require curing retarders, flow, and other special conditions to allow the geopolymer to fill in the voids, and the resultant material cannot be expected to provide the low density obtained when using coated expanded vermiculite as a loose aggregate. Such vermiculite cement is expected to have either high density and high strength, or low density and low strength.

The light weight geopolymer concretes of this invention avoid most of the challenges by using coated expanded vermiculite and optionally strength enhancing additives such as wollastonite. Expanded perlite, either regular, pre-treated with water repellent adjuvants or treatments, or cement-coated expanded perlite can be used as an alternative to coated expanded vermiculite, or in combination with coated expanded vermiculite. Highly fire resistant geopolymer concretes with high compressive strength, low density, low shrinkage, and dimensional stability was made by using ordinary waste materials such as coal fly ash.

It was thought that magnesium oxide could also compensate for the shrinkage of geopolymers. Since geopolymer shrinkage occurs at high temperatures, two different grades of magnesium oxide were used. One is a lightly calcined magnesium oxide which is typically used for OPC. Another grade of MgO is referred as dead burned (DB) magnesium oxide, prepared by heating magnesium carbonate at >1500° C. It is very inert and hydrolyzes very slowly. As seen from Table 2, adding 3.8% (based on fly ash, Comparative Formulation 0807F and Comparative Formulation 0807G), of either grade of MgO decreased the ambient strength of the geopolymer by more than 50%. Adding magnesium oxide to the formulations (0807F, G) also caused severe cracking and melting. Sample 0807E which had the highest level of vermiculite was the most stable, had only minor cracks after heating. Advantageously, the geopolymer compositions of the present invention are substantially free of magnesium oxide, by which we mean less than 0.5% by weight, preferably less than 0.3% by weight, or more preferably less than 0.1% by weight, or 0% by weight, of magnesium oxide, based on the weight of the fly ash.

Similarly, cenospheres are hollow ceramic fly ash particles recovered from coal fired power plants. When pulverized coal is burned at power plants fly ash is produced. Cenospheres are the hollow lighter particles that are contained within the fly ash. Even though cenospheres can decrease the specific gravity, the strength is reduced significantly, and the high temperature behavior did not see a significant improvement. See comparative examples formulation 0807C and 0807D, Table 2.

Expanded vermiculite is used to make lightweight concrete, but the vermiculite is often crushed during mixing, and absorbs water from the geopolymer solution, affecting the polymerization and weakening the resulting structure. Further, expanded vermiculite can expand and contract when absorbing or losing water, thereby weakening the gepolymer structure during the setting or curing phase, especially if heat is applied. Additionally, the water entrapped in the vermiculite can flash when exposed to heat such as found in a fire, adding significant strain to the geopolymer matrix and resulting in material failure. Expanded vermiculite can be coated to increase its strength and decrease its water absorption. That is, coating the expanded vermiculite in a substantially water-impervious coating, which also beneficially provides strength to maintain aggregate integrity. The calcium in the coating accelerates the cure and improve the strength of geopolymers. Therefore, a calcium based cement was considered as a coating for light weight vermiculite. Calcium sulfoaluminate cement is the preferred choice. Suitable coatings are OPC, calcium sulfoaluminate (CSA) cement, calcium aluminate cement, or their mixtures. The coating can also be a geopolymer composition. Optionally, the coating composition contains a water repellent. Additionally, the coating composition can have microaggregates, or for example fly ash or fine clay such as kaolin, fire clay, montmorillonite, bentonite, or attapulgite, or combinations thereof.

Fibers can add significant compressive strength and dimensional stability to concrete as it concrete is exposed to extreme heat such as fire. Wollastonite is used in many examples, is preferred. Other fibers include Alpha-alumina (for example 0.75 microns), chopped basalt fiber, other mineral fibers known in the art, synthetic fibers, chopped wool, and the like. Mineral fibers are preferred, and wollastonite is most preferred. Quantities and specifications given throughout the specification for wollastonite are also useful for other mineral fibers.

EXAMPLE 1

Expanded vermiculite (#4 Industrial, 50 mesh, 7 lbs/cubic foot density) from Specialty Vermiculite, Bala Cynwyd, PA, was used. Vermiculite was mixed with the dry powders of CSA cement and kaolin before the water was sprayed with mixing. Sufficient water was added to cure the cement. The wet mixture was kept in sealed containers for 48 hours to prevent moisture loss. After 7 days the crushing strength was tested using a Universal Strength Testing machine (Table 1). Composition JC15 has adequate strength and water repellency.

50 mesh vermiculite was selected because it was a convenient size for the samples to be formed. Other sizes, both larger or smaller, can be used under other circumstances. However, we believe the changes to the expanded coated vermiculite help relieve stress on the geopolymer composition when the composition is exposed to fire.

TABLE 1

| | | | | | | | |
|---|---|---|---|---|---|---|---|
| The effect of composition, parts by weight, on coated vermiculite strength | | | | | | | |
| Test ID | JC1 | JC2 | JC3 | JC4 | JC5 | JC6 | JC7 | JC8 |
| Verm | 10 | 10 | 10 | 10 | 10 | 10 | 10 | 10 |
| Kaolin | 2 | 2 | 2 | 2 | 2 | 2 | 2 | 0 |
| CSA | 10 | 10 | 10 | 10 | 10 | 10 | 10 | 6 |

16

TABLE 1-continued

| The effect of composition, parts by weight, on coated vermiculite strength | | | | | | | | |
|---|---|---|---|---|---|---|---|---|
| Test ID | JC1 | JC2 | JC3 | JC4 | JC5 | JC6 | JC7 | JC8 |
| water | 4 | 6 | 8 | 12 | 14 | 16 | 20 | 6 |
| BS1001A | 2 | 2 | 2 | 2 | 2 | 2 | 2 | 2 |
| Max force (kN) Crush test | 4.09 | 4.07 | 4.06 | 4.12 | 4.06 | 4.07 | 4.06 | 4.09 |

TABLE 1

| The effect of composition, parts by weight, on coated vermiculite strength | | | | | | | | |
|---|---|---|---|---|---|---|---|---|
| Test ID | JC9 | JC10 | JC11 | JC12 | JC13 | JC14 | JC15 | JC16 |
| Verm | 10 | 10 | 10 | 10 | 10 | 10 | 10 | 10 |
| Kaolin | 0 | 0 | 0 | 0 | 2 | 2 | 2 | 2 |
| CSA | 8 | 12 | 14 | 16 | 10 | 10 | 10 | 10 |
| water | 8 | 12 | 14 | 16 | 10 | 10 | 10 | 10 |
| BS1001A | 2 | 2 | 2 | 2 | 1.5 | 1 | 0.5 | 0.25 |
| Max force (kN) Crush test | 4.10 | 4.04 | 4.08 | 4.05 | 3.99 | 4.07 | 4.06 | 4.05 |

CSA = calcium sulfoaluminate cement,
BS1001A = Wacker Silres BS 1001A silicone water repellent Surprisingly, there was substantially no difference in crush strength with the amount of calcium sulfoaluminate cement coating the 50 mesh expanded vermiculite, within the range of vermiculite to CSA of 1 part vermiculite/1.6 parts calcium sulfoaluminate cement to 1 part vermiculite/0.6 parts calcium sulfoaluminate cement. The cement must form a substantially impervious coating about the vermiculite to retard or prevent the vermiculite from absorbing water during mixing or the geopolymer polymerization. The amount of cement coating the light weight aggregate, preferably expanded vermiculite, can range from 0.2 to 5 parts cement per part expanded vermiculite. The optimal amount of cement to vermiculite will change with aggregate size, but generally an amount between 1 part vermiculite/2 parts calcium sulfoaluminate cement to 1 part vermiculite/0.2 parts calcium sulfoaluminate cement, for example between 1 part vermiculite:0.4 parts calcium sulfoaluminate cement to 1 part vermiculite:1.5 parts calcium sulfoaluminate cement will be useful. Using other cements, an amount between 1 part vermiculite/2 parts cement to 1 part vermiculite/0.2 parts cement, for example between 1 part vermiculite:0.4 parts calcium cement to 1 part vermiculite:1.5 parts calcium cement, will be useful. The dry CSA, which may contain additives, is preferably mixed with the vermiculite, and then the water, which may contain additives, is beneficially added. Alternatively, the CSA composition can be admixed with water and then added to the expanded vermiculite. Beneficially, the coated vermiculite is not allowed to dry before sufficient curing is obtained.

The same ratios of cement to vermiculite given above are useful if the lightweight aggregate is perlite. The light weight aggregate can comprise cement-coated vermiculite, perlite, cement coated perlite, or mixtures thereof.

The cement, preferably comprising or consisting essentially of CSA, can also include between 0.0 to 1 part clay, for example between 0.1 to 0.4 parts clay, or other microaggregate. The kaolin or other clay may further inhibit the vermiculite or perlite from absorbing water, both during the preparation of the coated lightweight aggregate and during curing of the geopolymer.

Additionally or alternatively, the lightweight aggregate can be treated with a water repellant. Suitable silicone-based water repellants are known. The water repellant can be put directly on the vermiculite, or added with the coating cement. We used between 0.25 parts and 2 parts silicone-based water repellant per 10 parts vermiculite. Polymeric water repellants can alternatively or additionally be used.

We used in the examples above between 0.4 parts and 2 parts water per part of cement. Generally, CSA can be made with as little as 0.25 parts water per part CSA, but 0.35 parts water per part CSA is preferred. Given the similar properties of the resulting coated vermiculite, these values are sufficient. It is thought, however, that between 0.5 parts water to 1.5 parts water, preferably between 0.8 and 1.2 parts water, provided slightly increased crush strength.

The coated aggregates described here can be used with other concretes, including for example Portland cement.

EXAMPLE 2

The fly ash used was from a power station in South Carolina with a silica to alumina ratio of >2.0, and iron oxide ($Fe_2O_3$) content of approximately 15%.

For compressive strength determinations, the geopolymers were casted in 1" diameter by 3" high PVC pipes, cured at ambient temperature for 24 hours followed by additional cure at 80° C. for 24 hours. It is possible that additional days or weeks of curing may result in greater compressive strength.

Table 2 lists the composition and properties of exemplary formulations and comparative formulations. A typical formulation 0807A had an ambient compressive strength of 25.6 MPa and specific gravity of 1.56 after heating at 600° C. After heating to 800° C. and 1000° C. in a muffle furnace, the compressive strength decreased to 14.0 and 12.9 MPa, respectively.

length to diameter ratio of about 10 or more, to the formulation significantly increase the strength (FIG. 1).

Wollastonite fillers were found to moderately reduce shrinkage compared to the geopolymer alone (Vickers etc 2014). Ambient compressive strength was about 30 MPa, which increased after heating at high temperatures. Ambient density was >1.9, which was reduced to 1.75 or higher after heating. Densification was found at 600° C. or higher. The very high initial strength of this comparative example was promising, but the example did not perform as well when exposed to 1000° C. temperature. This suggested, however, that a mixture of expanded coated vermiculite and Wollastonite would be useful. However, it was believed that other aggregates in combination may result in much lighter concrete with sufficient compressive strength and with greater resistance to fire, particularly to temperatures near 800° C. which are common in fires.

The presence of cenospheres resulted in erratic behavior during heating and the inclusion of cenospheres is not recommended and should only be included in very minor amounts, if at all, even if expanded coated vermiculite is additionally present. The presence of magnesium oxide resulted in erratic behavior during heating and the inclusion of magnesium oxide is not recommended and should only be included in very minor amounts, if at all, even if expanded coated vermiculite is additionally present.

Example 0807E, having 17.1 parts coated expanded vermiculite per 100 parts fly ash, provided exceptional dimensional stability after exposure to 1000° C. See FIGS. 2 and 3. Example 0807E is an excellent low density geopolymer concrete, and the compressive strength of the sample increased as it was exposed to higher temperatures. The

TABLE 2

Composition and properties of 0807 series formulations. Strength, at ambient, after 800° C., and after 1000° C., is in MPa.

| Sample ID | Ambient (MPa) | after 800° C. | after 1000° C. | $Na_2O$/ Ash | $K_2O$/ Ash | $SiO_2$/ ash | $H_2O$/ Ash | Wolla/ Ash | Bas/ Ash | Verm/ Ash | Dry sg (600° C.) |
|---|---|---|---|---|---|---|---|---|---|---|---|
| 0807A | 25.6 | 14.0 | 12.9 | 4.3% | 4.3% | 8.7% | 30.8% | 0.0% | 1.0% | 5.0% | 1.56 |
| 0807B | 36.4 | 24.5 | 17.0 | 4.0% | 3.9% | 8.0% | 28.4% | 5.1% | 0.0% | 0.0% | 1.56 |
| 0807C | 13.1 | 16.4 | 12.5 | 3.7% | 3.7% | 7.5% | 26.7% | 0.0% | 1.0% | 15.1% | 1.30 |
| 0807D | 12.2 | 8.3 | 13.5 | 3.5% | 3.5% | 7.1% | 30.2% | 0.0% | 1.0% | 19.1% | 1.23 |
| 0807E | 11.7 | 10.3 | 16.8 | 3.6% | 3.5% | 7.2% | 30.7% | 0.0% | 1.0% | 17.1% | 1.30 |
| 0807F | 13.3 | 12.8 | | 4.3% | 4.3% | 8.7% | 30.8% | 0.0% | 1.0% | 5.2% | 1.51 |
| 0807G | 10.8 | 11.5 | 10.9 | 4.3% | 4.3% | 8.7% | 30.8% | 0.0% | 1.0% | 5.2% | 1.52 |

Wolla = Wollastonite,
Bas = chopped basalt fiber,
Verm = expanded coated vermiculite, Comparative examples 0807C and 0807D contained cenospheres. Comparative examples 0807F and 0807 G contained magnesium oxide, regular and dead burnt, respectively. None of these comparative examples 0807C, 0807D, 0807F, and 0807G contained coated expanded vermiculite.

Adding wollastonite, a natural micro-fiber with a length to diameter ratio of about 10 or more, to the formulation significantly increase the strength (FIG. 1). When 5.1% wollastonite (based on the weight of fly ash) was added to the formulation, the compressive strength increased by 42% from 25.6 to 36.4 MPa. This formulation (0807B) exceeds the strength requirement for OPC with a specific gravity of only 1.56. Example 0807B had no expanded coated vermiculite, but rather had 5.1 parts wollastonite per 100 part fly ash. Adding wollastonite, a natural micro-fiber with a initial compressive strength was good, but additives are needed to increase the compressive strength for many load bearing uses. Sample 0807E had a compressive strength of 56.7 MPa after heating at 1000° C. and hold for 30 minutes, which is much higher than the strength prior to heating and much higher than the 16.8 MPa measured just after reaching 1000° C. This suggests that the heat allowed additional curing and structuring of the concrete.

The stability of the geopolymer is very dependent on the amount of coated expanded vermiculite. See FIGS. 2 and 3, where it is shown that the sample containing about 17 parts expanded coated vermiculite per 100 parts fly ash showed no structural changes when heated.

For coated vermiculite containing about equal amounts of CSA or other cement and expanded vermiculite in the cement, is advantageously in the range of 2 to 100 parts by weight expanded coated vermiculite, for example in a ratio of 8 to 40 parts by weight expanded coated vermiculite, or in the range of 12 to 25 parts expanded coated vermiculite, preferably between 15 parts and 20 parts, more preferably between 15 parts and 18 parts by weight coated expanded vermiculite per 100 parts fly ash partially negated the structural changes of the geopolymer on heating, thereby preventing strain, cracking, deformation, and spalling. For applications where compressive strength is less important, for example for use as a fire barrier, the amount of coated vermiculite can be between 30 and 100 parts, or more, of coated expanded vermiculite per 100 parts fly ash. If the coated expanded vermiculite is made with 0.5 parts cement per part vermiculite, the ranges of coated expanded vermiculite per 100 parts geopolymer source can be decreased by about a quarter. If the coated expanded vermiculite is made with 2 parts cement per part vermiculite, the ranges of coated expanded vermiculite per 100 parts geopolymer source can be increased by about a third.

The lightweight geopolymer concretes of the present invention are fireproof, in that they do not burn. An important aspect of the present invention is that embodiments of the invention maintain stability and strength even when heated to 800° C., and in optimal cases when heated to 1000° C. This makes the material excellent for barrier material. The dimensional stability and strength retention when heated is better than traditional barrier materials such as foamed concrete, foamed geopolymer, vermiculite concrete, and geopolymer containing expanded vermiculite that is not cement-coated. Very light weight, having a specific gravity of between about 0.4 to about 1.1, can be made that have substantial strength and stability when exposed to 800° C., 1000° C., or fire.

Finally, another aspect of the invention is forming pre-made articles, such as doors, pillars, planks, bricks, and the like, where the manufacturing process can include heating the cured material to temperatures up to about 300, 400, 600, 800, or even 1000° C. This heating will provide the material with increased strength and minimal shrinkage if the installed components are subjected to extreme heat.

EXAMPLE 3

Compositions with different activator ratios, and with different levels of wollastonite and expended coated vermiculite, were prepared. The formulations are shown in Table 3A and properties are shown in Table 3B. The amount of coated expanded vermiculite was held between 15.8 parts to 18.6 parts to 100 parts fly ash, due to the remarkable structural integrity and strength exhibited by example 0807E. The amount of wollastonite was varied between 0 parts to 10 parts per 100 parts fly ash, since the inclusion of 5.1 parts wollastonite per 100 parts fly ash in sample 0807B provided markedly higher initial compressive strength. As shown in Table 3B, increasing wollastonite content, at least to 10 parts wollastonite per 100 parts fly ash, greatly increased the compressive strength of the samples. The compressive strength of the sample 0822C, having 10 parts wollastonite and 18.4 parts coated expanded vermiculite had an initial compressive strength of 63.4 MPa. This is very strong material suitable for load-bearing structural use in construction, and even more surprisingly, the compressive strength jumped to over 104 MPa after subjecting the sample to temperatures of 800° C. Its high temperature strength should be higher than the reported value of 104 MPa, but the test instrument has a maximum load of 5 metric tons and the test was terminated at 104 MPa to prevent damage to the instrument. Unfortunately, the changes to the lightweight geopolymer concrete during heating resulted in significant shrinkage and densification. Samples with 0 parts and with 10 parts wollastonite per 100 parts geopolymer source material, in this case fly ash, exhibited about 4.5% diameter shrinkage and about 4% height shrinkage after exposure to temperatures of 800° C. This is substantially greater shrinkage than was observed with samples containing 2.5 parts to 5.1 parts wollastonite per 100 parts fly ash. The lightweight geopolymer concrete of the present invention therefore advantageously comprises between 1 and 25 parts by weight, preferably between 2 and 15 parts by weight, for example between 2.5 and 10 parts by weight, or between 3 and 8 parts by weight, or between 3 and 7 parts by weight wollastonite per 100 parts geopolymer source material, in this case fly ash. Preferred embodiments contain between 5 parts and 10 parts by weight wollastonite per 100 parts geopolymer source material, in this case fly ash. Lesser amounts provide a concrete with more dimensional stability while greater amounts provide greater strength when the concrete is exposed to 800° C.

It is generally thought that fibers provide dimensional stability to concretes exposed to extreme heat, so 1 part by weight of basalt fibers per 100 parts fly ash were added to example 0821A, which further contained 17.5 parts coated expanded vermiculite and 5.1 parts wollastonite per 100 parts fly ash. While initial compressive strength was not very high, the compressive strength after exposure to 800° C. doubled the initial compressive strength. The height shrinkage after exposure to 800° C. was 4.7 percent. Fibers, including basalt fibers, can therefore be included in the concrete in small amounts, for example between 0.2 parts and 2 parts by weight fibers per 100 parts fly ash.

TABLE 3A

| Sample Code | Component/Fly Ash ratio (w/w) | | | | | | |
|---|---|---|---|---|---|---|---|
| | Na₂O | K₂O | SiO₂ | H₂O | Wolla | Basalt | Vermiculite |
| 0822A | 3.5% | 3.5% | 7.0% | 34.9% | 0.0% | 0.0% | 17.3% |
| 0822B | 3.5% | 3.4% | 6.9% | 34.5% | 2.5% | 0.0% | 17.6% |
| 0821A | 3.5% | 3.4% | 6.9% | 35.0% | 5.1% | 1.0% | 17.5% |
| 0822C | 3.3% | 3.3% | 6.6% | 33.5% | 10.0% | 0.0% | 18.4% |
| 0823A | 1.8% | 5.5% | 3.5% | 38.1% | 5.0% | 0.0% | 18.6% |
| 0823B | 2.2% | 4.6% | 4.4% | 37.9% | 5.0% | 0.0% | 18.6% |
| 0823C | 2.6% | 3.7% | 5.3% | 37.7% | 5.0% | 0.0% | 15.8% |

Composition of geopolymer formulations.

Wolla is wollastonite.

TABLE 3B

| | | | | | | | |
|---|---|---|---|---|---|---|---|
| | | | Properties of 0822 and 0823 series geopolymer compositions, initial and after heating to 800° C. | | | | |
| | weight loss | Dimension Change | | | Compressive Strength (MPa) | | |
| Sample Code | (ambient to 800° C.) | Diameter shrinkage | Height shrinkage | Density change | Ambient | After 800° C. | Strength change |
| 0822A | 10.3% | 4.5% | 4.0% | 2.9% | 12.2 | 29.6 | 143% |
| 0822B | 8.6% | 3.0% | 2.3% | −0.1% | 37.3 | 39.2 | 5% |
| 0821A | 8.6% | −0.2% | 4.7% | −3.9% | 15.4 | 29.9 | 94% |
| 0822C | 7.9% | 4.9% | 3.6% | 5.7% | 63.4 | >104.1 | 64% |
| 0823A | 7.5% | 2.3% | 1.8% | −1.0% | 7.6 | 9.6 | 27% |
| 0823B | 7.5% | 2.2% | 1.6% | −1.3% | 7.9 | 20.3 | 158% |
| 0823C | 7.3% | 2.5% | 2.0% | −0.2% | 12.2 | 18.3 | 50% |

The amount of soluble silica was varied from 3.5 parts to 7 parts per 100 parts fly ash. The greater the amount of soluble silica in the geopolymer solution, between the range of 3.5 parts to 7 parts by weight soluble silica per 100 parts geopolymer source, the greater the initial compressive strength and compressive strength after exposure to 800° C. However, it appears that matrix shrinkage after exposure to 800° C. is about 4% or more for samples having over 6.5 parts soluble silica per 100 parts fly ash, compared with 2 to 2.5% shrinkage with compositions containing 3 to 5.3 parts soluble silica per 100 parts fly ash. The very low diameter shrinkage for 0821A was probably measurement error. Generally, the geopolymer solution advantageously contains between 2 parts to 10 parts, for example between 3.5 and 8 parts, for example between 4 to 6 parts by weight soluble silica per 100 parts geopolymer source, e.g., per 100 parts fly ash.

The amount of wollastonite, as well as silica/ash ratio impact both ambient and high temperature strength (FIGS. 4 and 5). Sample 0822C (having 10 parts wollastonite, 6.6 parts soluble silica, and 18.4 parts coated expanded vermiculite) has very high strength at ambient and even higher compressive strength after heating at 800° C. Its high temperature strength should be higher than the reported value of 104 MPa, as the test instrument has a maximum load of 5 metric tons and the test was terminated at 104 MPa to prevent damage to the instrument. Formulation 0822C has higher shrinkage and the highest density gain after exposure to 800° C. Densification without structural damage (cracks) undoubtedly increase the strength. This composition would make an ideal lightweight heat resistant geopolymer concrete, especially if the concrete is preformed and heated after initial curing.

For uses where lower compressive strength can be allowed in exchange for lower shrinkage on heating, lower amounts of soluble silica and wollastonite can be used, for example between 2 and 8 parts, preferably between 4 and 7 parts wollastonite and between 3 parts and 7 parts, preferably between 3.5 parts and 5.5 parts soluble silica, per 100 parts geopolymer source material can be useful. The amount of coated expanded vermiculite, or coated expanded perlite, where the weight of the coating is about equal to the weight of vermiculite or perlite, is advantageously between 15 and 24 parts, preferably between 16 parts and 19 parts, by weight coated expanded vermiculite per 100 parts geopolymer source material can be useful. Of course, higher amounts of coated expanded vermiculite or coated expanded perlite can be used if compressive strength is not an issue, for example probably up to 50 parts or more coated expanded vermiculite per 100 parts geopolymer material can be used for geopolymer compositions that are meant to fireproof or insulate other structures, as opposed to bearing a significant load.

We believe the phenomena that a high strength lightweight geopolymer has strength gains after high temperature exposure is unprecedented. The material did not show any signs of melting since the shape of the material was unchanged, and the edges remain sharp. In contrast, the reported literature shows high strength geopolymer all decrease in strength, probably due to internal stress during the heating/cooling process.

EXAMPLE 4

Formulations containing low levels of soluble silica were prepared and analyzed as shown in Tables 4A and 4B. Low levels of soluble silica significantly deceased ambient strength. Formulations containing small particle perlite (Silbrico Sil Cell 42) had very significant strength gains after heating to 800° C. and 1000° C., probably due to melting and participation of polymerization of the silica of the perlite.

Even though the formulations containing perlite had significant shrinkage when heated to 1000° C., the low initial density and reasonable ambient strength may make these compositions useful for certain applications, for example applications at <800° C.

TABLE 4A

| | | | | | | | | Sil | | Compressive Strength | |
|---|---|---|---|---|---|---|---|---|---|---|---|

Composition and strength properties of 0827 and 0828 series formulations.

| | Component/Fly Ash ratio (w/w) | | | | | | | | Compressive Strength | | |
|---|---|---|---|---|---|---|---|---|---|---|---|
| | | | | | | | | Sil | | MPa | |
| ID | Na$_2$O | K$_2$O | SiO$_2$ | H$_2$O | Wolla | Verm | Cell | Ambient | 800° C. | 1000° C. |
| 0827A | 1.6% | 5.1% | 3.2% | 39.1% | 5.0% | 17.5% | | 7.1 | 7.9 | 15.4 |
| 0827B | 2.0% | 4.2% | 4.0% | 38.9% | 5.0% | 18.1% | | 14.6 | 13.0 | 26.1 |
| 0827C | 2.4% | 3.4% | 4.9% | 38.7% | 5.0% | 16.4% | | 12.4 | 14.9 | 26.6 |
| 0828A | 1.6% | 5.1% | 3.2% | 39.1% | 5.0% | | 5.2% | 11.3 | 28.4 | 98.2 |
| 0828B | 2.0% | 4.2% | 4.0% | 38.9% | 5.0% | | 4.5% | 14.5 | 46.9 | >105.2 |
| 0828C | 2.4% | 3.4% | 4.9% | 38.7% | 5.0% | | 4.4% | 14.3 | 45.9 | 79.0 |

TABLE 4B

Shrinkage and density properties of 0827 and 0828 series formulations.

| | ambient to 800° C. | | | ambient to 1000° C. | | | S.G. | S.G. |
|---|---|---|---|---|---|---|---|---|
| ID | Diameter shrinkage | Height shrinkage | wt loss | Diameter shrinkage | Height shrinkage | wt loss | after 800° C. | after 1000° C. |
| 0827A | 0.7% | 0.9% | 5.8% | 3.3% | 3.6% | 6.5% | 1.15 | 1.22 |
| 0827B | 0.9% | 1.3% | 6.7% | 3.1% | 2.9% | 9.7% | 1.18 | 1.20 |
| 0827C | 1.2% | 3.5% | 6.7% | 2.9% | 3.6% | 9.8% | 1.21 | 1.22 |
| 0828A | 1.3% | 2.3% | 5.3% | 11.2% | 11.8% | 8.4% | 1.12 | 1.42 |
| 0828B | 2.2% | 3.0% | 5.2% | 13.1% | 10.5% | 8.4% | 1.21 | 1.49 |
| 0828C | 3.1% | 3.4% | 5.4% | 9.6% | 8.4% | 9.3% | 1.24 | 1.42 |

Each of the above compositions are useful for specific purposes. Note each concrete has a specific gravity of between 1.12 and 1.25. The compressive strength of each example increased when the sample was exposed to 1000° C., and generally increased when each sample was exposed to 800° C. For coated expanded vermiculite samples, adding more soluble silica to the geopolymer composition resulted in increasing compressive strength, but also in increased shrinkage when the material was exposed to 800° C. and 1000° C.

Sample 0827A contains a small amount (3.2 parts) of soluble silica and a small amount (5 parts) of wollastonite, as well as an intermediate loading (17.5 parts) of coated expanded vermiculite, per 100 parts geopolymer source material. As expected, the initial compressive strength of this material is low, only about 7.1 MPa. This material gains strength, having a compressive strength of 7.9 MPa, after heating to 800° C. However, shrinkage when heated to 800° C. was less than 1%, about 0.8% on average, while the compressive strength of the material increased with the application of higher temperatures. This composition is useful where lower compressive strength can be tolerated.

Sample 0827B contains an intermediate amount (4 parts) of soluble silica and a small amount (5 parts) of wollastonite, as well as a slightly higher loading (18.1 parts) of coated expanded vermiculite, per 100 parts geopolymer source material. This sample gave a much higher initial ambient compressive strength, 14.6 MPa, and the compressive strength was substantially unchanged when exposed to 800° C. Shrinkage when heated to 800° C. was still low, about 1.2% on average, while the compressive strength of the material only decreased slightly with the application of 800° C.

Sample 0827C contains a high amount (4.9 parts) of soluble silica and a small amount (5 parts) of wollastonite, as well as a slightly lower loading (16.4 parts) of coated expanded vermiculite, per 100 parts geopolymer source material. This sample gave a good initial ambient compressive strength, 12.4 MPa, and the compressive strength substantially increased when exposed to 800° C. Shrinkage when heated to 800° C. was higher, about 1.2% in diameter and 3.5% in height.

Samples 0828 A, B, and C contained water repellent treated perlite rather than coated expanded vermiculite. These samples contained about 5 parts expanded perlite per 100 parts of fly ash. The specific gravity of the samples containing 5 parts perlite was similar to or only slightly higher than the specific gravity of samples containing about 17 parts coated expanded vermiculite. The initial ambient compressive strength of the samples was about the same as the initial compressive strength of the second and third vermiculite samples. What was surprising were the very large increases (by a factor of about 3) in compressive strength when samples were heated to 800 d° C., and increased even more when samples were heated to 1000° C. This was accompanied by about twice the shrinkage with temperature that was observed with the coated vermiculite samples, between about 1.5% to 3.3% at 800° C., and extreme shrinkage of about 10% when the samples were exposed to 1000° C. The shrinkage may result in instability in many structures if this lightweight cement is used in load-bearing applications, despite the large increases in compressive strength of the samples with exposure to heat.

Lightweight perlite geopolymer concretes, having wollastonite and soluble silica in amounts described in relation to expanded coated vermiculite cements, can be very useful for preformed structural material where the shrinkage, which can be forced by heating during the curing process, can be readily tolerated.

EXAMPLE 5

By using high levels of expanded coated vermiculite, geopolymer specific gravity can be reduced to <1.2 (0901A)

with very low shrinkage and acceptable strength. Slightly increasing the specific gravity to 1.24 resulted in more than 50% increase in ambient compressive strength (0901B). Using mixtures of expanded coated vermiculite and fine particle perlite (0901C, D) provided very good strength and low density. The high temperature shrinkage was high. Using mixtures of expanded coated vermiculite and large particle perlite (0902A) led to lower strength and similar high shrinkage.

Example compositions and properties are shown in Table 5A and properties on heating to temperatures of 800° C. and 1000° C. are shown in Table 5B.

TABLE 5A

| | Geopolymer composition and properties | | | | | | | | | | |
|---|---|---|---|---|---|---|---|---|---|---|---|
| | Component to Ash Ratio (w/100 w) | | | | | | | | Compressive Strength (MPa) | | |
| ID | Na$_2$O | K$_2$O | SiO$_2$ | H$_2$O | Wolla | Bas | Verm | Sil Cell | ambient | 800° C. | 1000° C. |
| 0821A | 3.5 | 3.4 | 6.9 | 35.0 | 5.1 | 1 | 17.5 | | 15.4 | 29.9 | 82.3 |
| 0822A | 3.5 | 3.5 | 7.0 | 34.9 | 0.0 | 0 | 17.3 | | 12.2 | 29.6 | 40 |
| 0822B | 3.5 | 3.4 | 6.9 | 34.5 | 2.5 | 0 | 17.6 | | 37.3 | 39.2 | 70.1 |
| 0822C | 3.3 | 3.3 | 6.6 | 33.5 | 10.0 | 0 | 18.4 | | 63.4 | 104.1 | 84.3 |
| 0829A | 3.3 | 3.3 | 6.6 | 39.4 | 10.0 | 0 | 17.1 | | 27.1 | 31.0 | 76.6 |
| 0829B (HSP, citrate) | 3.3 | 3.3 | 6.6 | 39.4 | 10.0 | 0 | 17.1 | | 25.3 | 39.2 | 46.3 |
| 0901A | 3.3 | 3.2 | 6.5 | 39.5 | 5.0 | 0 | 24.7 | | 21.2 | 28.3 | 39.4 |
| 0901B | 3.2 | 3.2 | 6.4 | 39.0 | 7.5 | 0 | 19.8 | | 33.2 | 41.0 | 54.4 |
| 0901C | 3.3 | 3.2 | 6.5 | 39.5 | 5.0 | 0 | 12.6 | 4.6 | 29.0 | 36.7 | 66.2 |
| 0901D | 3.2 | 3.2 | 6.4 | 39.0 | 7.5 | 0 | 10.2 | 3.9 | 29.2 | 38.6 | 74.5 |
| 0902A | 3.2 | 3.2 | 6.4 | 39.0 | 7.5 | 0 | 10.2 | 3.9 perm | 20.4 | 24.2 | 42.7 |

Perm is Permalite, a water repellent perlite from Dicalite-.permalite, Sil Cell is small particle perlite, Wolla is wollastonite, Bas is basalt fiber, Verm is coated expanded vermiculite.

TABLE 5B

| | Geopolymer composition and properties | | | | | | | | |
|---|---|---|---|---|---|---|---|---|---|
| | SG | | | Diameter shrinkage | | Height shrinkage | | Weight loss | |
| ID | ambient | 800° C. | 1000° C. | 800° C. | 1000° C. | 800° C. | 1000° C. | 800° C. | 1000° C. |
| 0821A | 1.31 | 1.26 | 1.35 | −0.2% | 4.4% | 4.7% | 4.0% | 8.6% | 10.40% |
| 0822A | 1.26 | 1.30 | 1.32 | 4.5% | 3.4% | 4.0% | 3.0% | 10.3% | 11.2% |
| 0822B | 1.28 | 1.32 | 1.38 | 3.0% | 5.5% | 2.3% | 4.7% | 8.6% | 10.4% |
| 0822C | 1.48 | 1.50 | 1.65 | 4.9% | 8.3% | 3.6% | 3.6% | 7.9% | 10.2% |
| 0829A | 1.28 | 1.26 | 1.33 | 2.3% | 4.4% | 2.3% | 3.7% | 8.2% | 9.4% |
| 0829B (HSP, citrate) | 1.26 | 1.25 | 1.29 | 2.9% | 4.7% | 2.8% | 3.8% | 9.8% | 11.3% |
| 0901A | 1.18 | 1.15 | 1.20 | 1.8% | 4.4% | 2.0% | 3.2% | 8.7% | 10.5% |
| 0901B | 1.24 | 1.22 | 1.26 | 2.2% | 3.9% | 2.1% | 3.3% | 9.4% | 10.9% |
| 0901C | 1.10 | 1.12 | 1.24 | 2.5% | 7.3% | 2.9% | 5.8% | 7.5% | 8.4% |
| 0901D | 1.16 | 1.20 | 1.29 | 3.9% | 7.0% | 3.1% | 5.8% | 7.4% | 8.1% |
| 0902A | 1.13 | 1.14 | 1.27 | 2.6% | 6.5% | 3.0% | 6.0% | 7.0% | 7.8% |

Sample 0829A is an exemplary high strength coated vermiculite light weigh geopolymer concrete, having high amounts of soluble silica (6.6 parts) and wollastonite (10 parts) per 100 parts fly ash. As expected, the initial compressive strength of 27.1 MPa is sufficiently high for most load bearing applications, and the compressive strength increased substantially after exposure to 800° C. and 1000 d° C. The initial specific gravity was 1.28, which is well within the definition of lightweight concrete. On heating to 800° C., there was only 2.3% shrinkage. The shrinkage and compressive strength each further increased after the sample was exposed to 1000° C.

Sample 0829B had the same composition as sample 0829A, except the addition of 2.8% Naxaf HSP (naphthalenesulfonate-formaldehyde condensate water reducer) and 4.2% tripotassium citrate curing retarder. These additives had a adverse effect on all geopolymer concrete properties, including lower compressive strength at most temperatures and higher shrinkage.

Samples 0901 A and B were formulated with high amounts (6.5 parts) soluble silica. Sample 0901A had 5 parts wollastonite and a very high loading (24.7 parts) of coated expanded vermiculite. The initial compressive strength of 21.2 MPa increased substantially with exposure to 800 and to 1000° C. Shrinkage after exposure to 800° C. was only about 1.9%, which is reasonable for load bearing construction materials. The specific gravity of the geopolymer concrete was 1.18, which is a very light lightweight concrete. Sample 0901B had more (7.5 parts) wollastonite and a high loading (19.8 parts) of coated expanded vermiculite. The initial compressive strength of 33.2 MPa is sufficient for load bearing concrete, and the compressive strength increased substantially with exposure to 800 and to 1000° C.

Shrinkage after exposure to 800° C. was only about 2.1 to 2.2%, which only slightly higher than the 1.9% of the previous example. This is a reasonable tradeoff for the roughly 50% increase in compressive strength of this sample compared to the previous sample.

Sample 0901C was similar in composition to 0901A, except it contained 12.6 parts coated expanded vermiculite and 4.6 parts perlite, compared to the 24.7 parts of coated expanded vermiculite in sample 0901A. Both the initial compressive strength and the compressive strength after exposure to 800 and 1000° C. was about 40 percent greater than exhibited by sample 0901A. This initial specific gravity was 1.1, almost the same as water. The excellent compressive strength and light weight were accompanied by moderate shrinkage (2.7%) at 800° C. and high shrinkage (about 6.5%) at 1000° C.

Sample 0901D was similar to sample 0901C, but it had lesser amounts of coated expanded vermiculite and of perlite. The specific gravity was higher, the compressive strength was about the same as found with 0901C, but the shrinkage was about 3.5% at 800° C. Sample 0902A had a composition substantially identical to that of 0901D, but the small particle size perlite (Sil Cell) was replaced with a perlite of larger particle size. Compressive strength fell significantly, while shrinkage declined moderately, each in comparison to sample 0901D.

EXAMPLE 6

Addition of potassium citrate or sodium tripolyphosphate improved the ambient and high temperature strength (Tables 6A, B), probably due to better packing and better cure properties.

TABLE 6A

| | Component to Ash Ratio (w/100 w) | | | | | | K | | Compressive Strength (MPa) | | |
|---|---|---|---|---|---|---|---|---|---|---|---|
| ID | Na$_2$O | K$_2$O | SiO$_2$ | H$_2$O | Wolla | Verm | citrate | STTP | ambient | 800° C. | 1000° C. |
| 0905A | 3.5 | 3.4 | 6.9 | 34.5 | 2.5 | 17.1 | | | 36.0 | 42.4 | 74.9 |
| 0905B | 3.5 | 3.4 | 6.9 | 34.5 | 2.5 | 17.1 | 2.7% | | 40.9 | 44.4 | 81.2 |
| 0905C | 3.5 | 3.4 | 6.9 | 34.5 | 2.5 | 17.6 | | 0.4% | 42.1 | 52.3 | 75.6 |

STTP = sodium tripolyphosphate

Note that increasing the soluble silica to 6.9 parts had a great impact on the compressive strength, as compared to previous examples. These samples all had an initial compressive strength of over 36 MPa, which is high considering only 2.5 parts wollastonite was used. Use of potassium citrate increased the compressive strength by about 10% over the baseline sample, while also reducing shrinkage. Use of sodium tripolyphosphate increased the compressive strength by about 10% over the baseline sample, while having substantially no effect on shrinkage.

TABLE 6B

| | | SG | | Diameter shrinkage | | Height shrinkage | | Weight loss | |
|---|---|---|---|---|---|---|---|---|---|
| ID | ambient | 800° C. | 1000° C. | 800° C. | 1000° C. | 800° C. | 1000° C. | 800° C. | 1000° C. |
| 0905A | 1.31 | 1.30 | 1.39 | 2.2% | 5.4% | 2.2% | 4.9% | 7.3% | 8.2% |
| 0905B | 1.30 | 1.27 | 1.37 | 1.9% | 5.5% | 1.8% | 3.6% | 8.3% | 9.2% |
| 0905C | 1.28 | 1.27 | 1.40 | 2.1% | 6.3% | 2.3% | 4.8% | 7.2% | 8.3% |

EXAMPLE 7

Higher levels of expanded coated vermiculite can be used to decrease the specific gravity to <1.2 while maintaining reasonable strength (Tables 7A, B). Because of the cure accelerating effect of the calcium-containing coatings on the vermiculite, cure retarders are advantageously used. An alternative, or complementary, method of reducing the specific gravity to less than 1.2 would be to utilize a coated expanded vermiculite that had less cement, e.g., CSA, for example 0.5 parts to 0.8 parts CSA per part expanded vermiculite.

TABLE 7A

| | Component to Ash Ratio (w/100 w) | | | | | | | | Compressive Strength (MPa) | | |
|---|---|---|---|---|---|---|---|---|---|---|---|
| ID | Na₂O | K₂O | SiO₂ | H₂O | Wolla | Bas | Verm | K citrate | STTP | ambient | 800° C. | 1000° C. |
| 0908A | 3.46 | 3.42 | 6.92 | 34.5 | 2.50 | | 24.72 | | 0.35 | 46.2 | 31.2 | 50.9 |
| 0908B | 3.46 | 3.42 | 6.92 | 34.5 | 2.50 | 1.0 | 20.92 | | 0.35 | 40.0 | 47.2 | 67.0 |
| 0908C | 3.46 | 3.42 | 6.92 | 38.5 | 2.50 | | 31.26 | | 0.35 | 33.0 | 25.3 | 39.3 |
| 0908D | 3.53 | 3.49 | 7.05 | 38.9 | 2.49 | | 31.63 | | 0.68 | 26.2 | 31.4 | 46.5 |
| 0908E | 3.46 | 3.42 | 6.92 | 38.5 | 2.50 | | 27.14 | 2.71 | 1.02 | 42.0 | 36.9 | 48.5 |
| 0909A | 3.46 | 3.42 | 6.92 | 38.5 | 2.5 wool | | 27.14 | 2.71 | 1.02 | 38.9 | 34.7 | 46.8 |

Wool = Fibertec micro-wool FRM

As seen in the Tables 7A and B, high strength lightweight geopolymer cements can be formulated with high, e.g., over 20 parts, for example between 21 parts and 50 parts, more particularly between 20 parts and 32 parts coated expanded vermiculite per 100 parts dry geopolymer source material. Using high amounts of soluble silica provides excellent compressive strength, in most cases greater than 33 MPa, while the shrinkage at 800° C. is less than expected, being between 2 and 2.9%. Overuse of curing retardants can have a small deleterious effect. See, for example, sample 0908C having 0.35 parts STTP versus sample 0908D using 0.68 parts STTP. The second sample has almost 20% less compressive strength than the sample using less STTP.

The amount of curing retardants will vary with composition, but will be easily ascertainable by those of ordinary skill in the art having benefit of this disclosure.

TABLE 7B

| | SG | | | Diameter shrinkage | | Height shrinkage | | Weight loss | |
|---|---|---|---|---|---|---|---|---|---|
| ID | ambient | 800° C. | 1000° C. | 800° C. | 1000° C. | 800° C. | 1000° C. | 800° C. | 1000° C. |
| 0908A | 1.24 | 1.21 | 1.28 | 1.8% | 4.5% | 2.0% | 4.1% | 8.4% | 9.8% |
| 0908B | 1.26 | 1.24 | 1.30 | 2.4% | 4.6% | 2.1% | 4.2% | 8.2% | 9.6% |
| 0908C | 1.15 | 1.14 | 1.17 | 2.3% | 3.9% | 2.0% | 3.9% | 8.2% | 8.4% |
| 0908D | 1.16 | 1.15 | 1.20 | 2.4% | 3.7% | 2.3% | 3.8% | 7.5% | 8.2% |
| 0908E | 1.19 | 1.18 | 1.26 | 2.9% | 4.1% | 2.6% | 4.2% | 9.2% | 9.8% |
| 0909A | 1.25 | 1.19 | 1.24 | 2.7% | 4.2% | 2.8% | 3.7% | 9.7% | 10.0% |

The geopolymer composite material is expected to have widespread applications for the construction industry to replace Portland cement or magnesium oxide cement. In particular, the composite will be very useful for SIP (Structural Insulated Panels) where a fire-resistant material that can retain strength after fire exposure could maintain the integrity of the structure. The material can also be used in critical infrastructures such as tunnels and subway stations where fire could cause severe damage and even collapse of Portland cement-based structures.

Several references were summarized herein, especially with respect to prior art formulations, and may be but are not necessarily pertinent to any claims. These references include: A. Z. Mohd Ali, Jay Sanjayan, and Maurice Guerrieri, Performance of geopolymer high strength concrete wall panels and cylinders when exposed to a hydrocarbon fire, Construction and Building Materials, 137, 195-207, 2017. Willian D. A. Richard, Les Vickers, Arie van Riessen, Performance of fibre reinforced, low density metakaolin geopolymers under simulated fire conditions, Applied Clay Science, 73, 71-77, 2013. William D. A. Rickard and Arie van Riessen, Performance of solid and cellular structured fly ash geopolymers exposed to a simulated fire, Cement & Concrete Composites, 48, 75-82, 2014. W. D. Richard, C. S. Kealley, and A. Riessen, J Amer. Ceram. Soc. 98, 929-939, 2015. Prabir Kumar Sarker, Sean Kelly, Zhitong Yao, Effect of fire exposure on cracking, spalling and residual strength of fly ash geopolymer concrete, Materials & Design, 63, 584-592, 2014. Prabir Kumar Sarker, Simon Mcbeath, Fire endurance of steel reinforced fly ash geopolymer concrete element, Construction and Building Materials, 90, 91-98, 2015. F. U. A. Shaikh and V. Vimonsatit, Compressive strength of fly-ash-based geopolymer concrete at elevated temperatures, Fire and Materials, 39(2), 174-188, 2015. Ibrahim Türkmen, Mehmet Burhan Karakoç, Fatih Kantarci, Müslüm Murat Maraş, Ramazan Demirboğa, Fire resistance of geopolymer concrete produced from Elaziğ ferrochrome slag, Fire and Materials, 40(6), 836-847, 2016. Les Vickers, Willian D. A. Richard, Arie van Riessen, Strategies to control the high temperature shrinkage of fly ash based geopolymers, Thermochimica Acta, 580, 20-27, 2014. K. Zulkifly, H C Yong, M M A B Abdullah, L Y Ming, D Panias, and K. Sakkas, IOP Conf. Series: Materials Science and Engineering 209, 012085, 2017

The embodiments described herein merely represent exemplary implementations and are not intended to necessarily limit the present disclosure to any specific examples. Instead, various modifications can be made to these embodiments as would be understood by one of ordinary skill in the art. Any such modifications are intended to be included within the spirit and scope of the present disclosure and protected by the following claims.

We claim:

1. A lightweight geopolymer concrete, comprising geopolymer and a cured cement-coated light weight aggregate material, said cement having a different composition than the geopolymer, said lightweight geopolymer concrete having a specific gravity less than 2.0 and a compressive strength of at least 10 MPa, wherein said lightweight geopolymer concrete has substantially no loss of compressive strength when exposed to high temperatures of 800° C.

2. The lightweight geopolymer concrete of claim 1, said lightweight geopolymer concrete formed from reacting a geopolymer source material, soluble alkaline silicate, a fiber, in the presence of said cement-coated light weight aggregate material, wherein said lightweight geopolymer concrete has a compressive strength of at least 15 MPa.

3. The lightweight geopolymer concrete of claim 1, said lightweight geopolymer concrete formed from polymerizing 100 parts of geopolymer source material, between 2 and 10 parts soluble alkali silicate, in the presence of between 2 and 12 parts by weight wollastonite and between 5 and 40 parts cured cement coated vermiculite, wherein said lightweight geopolymer concrete has a compressive strength of at least 20 MPa.

4. The lightweight geopolymer concrete of claim 3, wherein said lightweight geopolymer concrete has a compressive strength of at least 30 MPa.

5. The lightweight geopolymer concrete of claim 1, wherein said cured cement-coated light weight aggregate material comprises expanded vermiculite coated with a cured cement coating, said coating comprising calcium sulfoaluminate cement, calcium aluminate cement, or mixtures thereof, in an amount of between 0.2 to 5 parts by weight cement to 1 part by weight of expanded vermiculite.

6. The lightweight geopolymer concrete of claim 5, wherein the cured cement-coated light weight aggregate material comprises expanded vermiculite and calcium sulfoaluminate cement in an amount between 0.5 parts and 2 parts by weight of cement per part by weight expanded vermiculite.

7. The lightweight geopolymer concrete of claim 5, wherein the cement-coated light weight aggregate material further comprises a water repellant.

8. The lightweight geopolymer concrete of claim 5, wherein the cement-coated light weight aggregate material further comprises between 0.1 to 4 parts by weight fly ash or clay per part cement.

9. A lightweight geopolymer concrete comprising geopolymer, a fiber material, and a cured cement-coated light weight aggregate material, said cement coating on the aggregate comprising calcium and having a different composition than the geopolymer, said lightweight geopolymer formed from a geopolymer source material and about 0.03 to 0.08 parts of soluble alkali silicate per part of geopolymer source material, wherein said lightweight geopolymer concrete has substantially no loss of compressive strength when heated to 800° C.

10. The lightweight geopolymer concrete of claim 9, said lightweight geopolymer concrete having a specific gravity of between about 0.8 to about 1.5 and a compressive strength of at least 30 MPa.

11. The lightweight geopolymer concrete of claim 9, wherein the compressive strength of the concrete after heating the concrete to a temperature of 800° C. is higher than the compressive strength of the concrete after curing.

12. A method of forming a lightweight geopolymer concrete comprising the steps of a) providing a 100 parts by weight of a source of geopolymer, between 2 and 100 parts by weight of a cement-coated lightweight aggregate, between 2 and 20 parts of a soluble alkali silicate, and b) curing the geopolymer by polymerization into a geopolymer concrete.

13. The method of claim 12, wherein between 0.5 and 20 parts of micro-fibers are added prior to polymerization.

14. The method of claim 13, wherein the microfibers comprise wollastonite, micro-wools of mineral nature, or mixtures thereof.

15. The method of claim 12, further comprising heating the cured geopolymer concrete to at least 50° C.

16. The method of claim 12, further comprising adding an effective amount of one or more cure retarders, cure accelerators, water reducers, and colorants, or combinations thereof, to the geopolymer solution prior to or during polymerization.

17. The method of claim 12, further comprising adding chopped fibers, woven or non-woven fiber mats, or mixtures of the above prior to polymerizing.

* * * * *